US012375232B2

(12) United States Patent
Ly et al.

(10) Patent No.: US 12,375,232 B2
(45) Date of Patent: Jul. 29, 2025

(54) CROSS-SLOT CHANNEL ESTIMATION OF UPLINK REFERENCE SIGNALS

(71) Applicant: QUALCOMM Incorporated, San Diego, CA (US)

(72) Inventors: Hung Dinh Ly, San Diego, CA (US); Sanghoon Kim, San Jose, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 828 days.

(21) Appl. No.: 17/644,454

(22) Filed: Dec. 15, 2021

(65) Prior Publication Data

US 2022/0224474 A1 Jul. 14, 2022

Related U.S. Application Data

(60) Provisional application No. 63/199,625, filed on Jan. 13, 2021, provisional application No. 63/199,626, filed on Jan. 13, 2021.

(51) Int. Cl.
*H04L 5/00* (2006.01)
*H04L 25/02* (2006.01)
*H04W 72/044* (2023.01)

(52) U.S. Cl.
CPC ........ *H04L 5/0048* (2013.01); *H04L 25/0224* (2013.01); *H04W 72/044* (2013.01)

(58) Field of Classification Search
CPC ............... H04L 5/0048; H04L 25/0224; H04L 25/0228; H04L 25/0204; H04L 5/001; H04L 5/0091; H04W 72/044
See application file for complete search history.

(56) References Cited

U.S. PATENT DOCUMENTS

2019/0327744 A1\* 10/2019 Sun .................. H04W 72/0453
2022/0210806 A1\* 6/2022 Rastegardoost .. H04W 74/0833

\* cited by examiner

*Primary Examiner* — Joseph E Dean, Jr.
(74) *Attorney, Agent, or Firm* — Harrity & Harrity, LLP

(57) ABSTRACT

Various aspects of the present disclosure generally relate to wireless communication. In some aspects, a mobile station may generate capability information that indicates a capability of the mobile station to support cross-slot channel estimation based on uplink reference signals across uplink transmissions after switching between a first carrier and a second carrier, based at least in part on the mobile station being capable of supporting cross-slot channel estimation across the uplink transmissions. The mobile station may transmit the capability information. Numerous other aspects are described.

30 Claims, 24 Drawing Sheets

| Slot # | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Carrier 2 | D | D | D | S | U | D | D | S | U | U | D | D | D | S | U | D | D | S | U | U |

1804  1806

| Slot # | 0 | 1 | 2 | 3 | 4 | 5 | 6 | 7 | 8 | 9 |
|---|---|---|---|---|---|---|---|---|---|---|
| Carrier 1 | U | U | U | U |  | U | U | U | U |  |

PUSCH/PUCCH DMRS cross-slot channel estimation

No PUSCH/PUCCH DMRS cross-slot channel estimation

PUSCH/PUCCH DMRS cross-slot channel estimation

FIG. 18

CROSS-SLOT CHANNEL ESTIMATION OF UPLINK REFERENCE SIGNALS

CROSS-REFERENCE TO RELATED APPLICATION

This patent application claims priority to U.S. Provisional Patent Application No. 63/199,625, filed on Jan. 13, 2021, entitled "CROSS-SLOT CHANNEL ESTIMATION OF UPLINK REFERENCE SIGNALS WITH SUPPLEMENTARY UPLINK CARRIER" and U.S. Provisional Patent Application No. 63/199,626, filed on Jan. 13, 2021, entitled "CROSS-SLOT CHANNEL ESTIMATION OF UPLINK REFERENCE SIGNALS WITH UPLINK SWITCHING FOR UPLINK CARRIER AGGREGATION," which are assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for supporting cross-slot channel estimation of uplink reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B. The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes generating, by the mobile station, capability information that indicates a capability of the mobile station to support cross-slot channel estimation based on uplink reference signals across uplink transmissions after switching between a normal uplink (NUL) carrier and a supplementary uplink (SUL) carrier, based at least in part on the mobile station being capable of supporting cross-slot channel estimation across the uplink transmissions and being capable of switching to or from the SUL carrier. The uplink transmissions may be consecutive uplink transmissions or uplink transmissions in consecutive time slots. The method includes transmitting, by the mobile station, the capability information.

In some aspects, a method of wireless communication performed by a base station includes receiving, by the base station from a mobile station, first capability information that indicates a capability of the mobile station to support cross-slot channel estimation based on uplink reference signals across uplink transmissions and that indicates a capability of the mobile station to switch to or from a SUL carrier. The method includes receiving, by the base station from the mobile station, second capability information that indicates a capability of the mobile station to support cross-slot channel estimation across the uplink transmissions after switching between a NUL carrier and the SUL carrier. The method includes transmitting, by the base station to the mobile station, a communication based at least in part on channel estimates for uplink transmissions of uplink reference signals on one or more of the NUL carrier or the SUL carrier.

In some aspects, a method of wireless communication performed by a mobile station includes transmitting, by the mobile station, first uplink reference signals in a first time slot and switching, by the mobile station in a second time slot, between a first carrier and a second carrier for uplink transmission. The first carrier or the second carrier may be a SUL carrier. The method includes transmitting, by the mobile station, second uplink reference signals in a third time slot. Based at least in part on the switching, the transmitting may be independent of maintaining phase continuity between the first uplink reference signals and the second uplink reference signals.

In some aspects, a mobile station for wireless communication includes a memory and one or more processors coupled to the memory. The one or more processors are configured to, based at least in part on information stored in the memory, generate capability information that indicates a capability of the mobile station to support cross-slot channel estimation based on uplink reference signals across uplink transmissions after switching between a NUL carrier and a SUL carrier, based at least in part on the mobile station being capable of supporting cross-slot channel estimation across the uplink transmissions and being capable of switching to or from the SUL carrier, and transmit the capability information.

In some aspects, a base station for wireless communication includes a memory and one or more processors coupled to the memory. The one or more processors are configured to, based at least in part on information stored in the memory, receive first capability information that indicates a capability of the mobile station to support cross-slot channel estimation based on uplink reference signals across uplink transmissions and that indicates a capability of the mobile station to switch to or from a SUL carrier. The one or more processors are configured to, based at least in part on information stored in the memory, receive second capability information that indicates a capability of the mobile station to support cross-slot channel estimation across the uplink transmissions after switching between a NUL carrier and the SUL carrier and transmit a communication based at least in part on channel estimates for uplink transmissions of uplink reference signals on one or more of the NUL carrier or the SUL carrier.

In some aspects, a mobile station for wireless communication includes a memory and one or more processors coupled to the memory. The one or more processors are configured to, based at least in part on information stored in the memory, transmit first uplink reference signals in a first time slot and switch, in a second time slot, between a first carrier and a second carrier for uplink transmission. The first carrier or the second carrier may be a SUL carrier. The one or more processors are configured to, based at least in part on information stored in the memory, transmit second uplink reference signals in a third time slot, where, based at least in part on the switching, the transmitting is independent of maintaining phase continuity between the first uplink reference signals and the second uplink reference signals.

In some aspects, a non-transitory computer-readable medium storing a set of instructions for wireless communication includes one or more instructions that, when executed by one or more processors of a mobile station, cause the mobile station to generate capability information that indicates a capability of the mobile station to support cross-slot channel estimation based on uplink reference signals across uplink transmissions after switching between a NUL carrier and a SUL carrier, based at least in part on the mobile station being capable of supporting cross-slot channel estimation across the uplink transmissions and being capable of switching to or from the SUL carrier, and transmit the capability information.

In some aspects, a non-transitory computer-readable medium storing a set of instructions for wireless communication includes one or more instructions that, when executed by one or more processors of a base station, cause the base station to receive first capability information that indicates a capability of the mobile station to support cross-slot channel estimation based on uplink reference signals across uplink transmissions and that indicates a capability of the mobile station to switch to or from a SUL carrier, receive second capability information that indicates a capability of the mobile station to support cross-slot channel estimation across the uplink transmissions after switching between a NUL carrier and the SUL carrier, and transmit a communication based at least in part on channel estimates for uplink transmissions of uplink reference signals on one or more of the NUL carrier or the SUL carrier.

In some aspects, a non-transitory computer-readable medium storing a set of instructions for wireless communication includes one or more instructions that, when executed by one or more processors of a mobile station, cause the mobile station to transmit first uplink reference signals in a first time slot, switch, in a second time slot, between a first carrier and a second carrier for uplink transmission, where the first carrier or the second carrier is a SUL carrier, and transmit second uplink reference signals in a third time slot, where, based at least in part on the switching, the transmitting is independent of maintaining phase continuity between the first uplink reference signals and the second uplink reference signals.

In some aspects, an apparatus for wireless communication includes means for generating capability information that indicates a capability of the apparatus to support cross-slot channel estimation based on uplink reference signals across uplink transmissions after switching between a NUL carrier and a SUL carrier, based at least in part on the apparatus being capable of supporting cross-slot channel estimation across the uplink transmissions and being capable of switching to or from the SUL carrier, and means for transmitting the capability information.

In some aspects, an apparatus for wireless communication includes means for receiving first capability information that indicates a capability of a mobile station to support cross-slot channel estimation based on uplink reference signals across uplink transmissions and that indicates a capability of the mobile station to switch to or from a SUL carrier, means for receiving second capability information that indicates a capability of the mobile station to support cross-slot channel estimation across the uplink transmissions after switching between a NUL carrier and the SUL carrier, and means for transmitting a communication based at least in part on channel estimates for uplink transmissions of uplink reference signals on one or more of the NUL carrier or the SUL carrier.

In some aspects, an apparatus for wireless communication includes means for transmitting first uplink reference signals in a first time slot, means for switching, in a second time slot, between a first carrier and a second carrier for uplink transmission, where the first carrier or the second carrier is a SUL carrier, and means for transmitting second uplink reference signals in a third time slot, where, based at least in part on the switching, the transmitting is independent of maintaining phase continuity between the first uplink reference signals and the second uplink reference signals.

In some aspects, a method of wireless communication performed by a mobile station includes generating, by the mobile station, capability information that indicates a capability of the mobile station to support cross-slot channel estimation based on uplink reference signals across uplink transmissions after switching between a first carrier and a second carrier, based at least in part on the mobile station being capable of supporting cross-slot channel estimation across the uplink transmissions. The method includes transmitting, by the mobile station, the capability information. The uplink transmissions may be consecutive uplink transmissions or uplink transmissions in consecutive time slots. The first carrier and a second carrier may be combined for uplink inter-band carrier aggregation or uplink intra-band carrier aggregation. The generating may include generating the capability information further based at least in part on being capable of uplink carrier switching between the uplink transmissions.

In some aspects, a method of wireless communication performed by a base station includes receiving, by the base station from a mobile station, first capability information that indicates a capability of the mobile station to support cross-slot channel estimation based on uplink reference signals across uplink transmissions and to support uplink carrier switching between the uplink transmissions and receiving, by the base station from the mobile station, second capability information that indicates a capability of the mobile station to support cross-slot channel estimation based on uplink reference signals across uplink transmissions after switching between a first carrier and a second carrier. The method includes transmitting, by the base station to the mobile station, a communication based on channel estimates for uplink transmissions of uplink reference signals on one or more of the first carrier or the second carrier. The first carrier and a second carrier may be combined for uplink inter-band carrier aggregation or uplink intra-band carrier aggregation.

In some aspects, a method of wireless communication performed by a mobile station includes transmitting, by the mobile station, first uplink reference signals on a first carrier in a first time slot and switching, by the mobile station in a second time slot, between the first carrier and a second carrier for uplink transmission. The method includes transmitting, by the mobile station, second uplink reference signals on the first carrier in a third time slot, where, based at least in part on the switching, the transmitting is independent of maintaining phase continuity between the first uplink reference signals and the second uplink reference signals. The first carrier and a second carrier may be combined for uplink inter-band carrier aggregation or uplink intra-band carrier aggregation.

In some aspects, a mobile station for wireless communication includes a memory and one or more processors coupled to the memory. The one or more processors are configured to, based at least in part on information stored in the memory, generate capability information that indicates a capability of the mobile station to support cross-slot channel estimation based on uplink reference signals across uplink transmissions after switching between a first carrier and a second carrier, based at least in part on the mobile station being capable of supporting cross-slot channel estimation across the uplink transmissions, and transmit the capability information.

In some aspects, a base station for wireless communication includes a memory and one or more processors coupled to the memory. The one or more processors are configured to, based at least in part on information stored in the memory, receive first capability information that indicates a capability of the mobile station to support cross-slot channel estimation based on uplink reference signals across uplink transmissions, and receive second capability information that indicates a capability of the mobile station to support cross-slot channel estimation based on uplink reference signals across uplink transmissions after switching between a first carrier and a second carrier. In some aspects, the capability information indicates a capability of the mobile station to support uplink carrier switching between the uplink transmissions. In some aspects, the capability information indicates a capability of the mobile station to switch to or from a SUL carrier. The one or more processors are configured to, based at least in part on information stored in the memory, transmit a communication based on channel estimates for uplink transmissions of uplink reference signals on one or more of the first carrier or the second carrier.

In some aspects, a mobile station for wireless communication includes a memory and one or more processors coupled to the memory. The one or more processors are configured to, based at least in part on information stored in the memory, transmit first uplink reference signals on a first carrier in a first time slot and switch between the first carrier and a second carrier for uplink transmission in a second time slot. The one or more processors are configured to, based at least in part on information stored in the memory, transmit second uplink reference signals on the first carrier in a third time slot, where, based at least in part on the switching, the transmitting is independent of maintaining phase continuity between the first uplink reference signals and the second uplink reference signals.

In some aspects, a non-transitory computer-readable medium storing a set of instructions for wireless communication includes one or more instructions that, when executed by one or more processors of a mobile station, cause the mobile station to generate capability information that indicates a capability of the mobile station to support cross-slot channel estimation based on uplink reference signals across uplink transmissions after switching between a first carrier and a second carrier, based at least in part on the mobile station being capable of supporting cross-slot channel estimation across the uplink transmissions, and transmit the capability information.

In some aspects, a non-transitory computer-readable medium storing a set of instructions for wireless communication includes one or more instructions that, when executed by one or more processors of a base station, cause the base station to receive first capability information that indicates a capability of the mobile station to support cross-slot channel estimation based on uplink reference signals across uplink transmissions, receive second capability information that indicates a capability of the mobile station to support cross-slot channel estimation based on uplink reference signals across uplink transmissions after switching between a first carrier and a second carrier, and transmit a communication based on channel estimates for uplink transmissions of uplink reference signals on one or more of the first carrier or the second carrier.

In some aspects, a non-transitory computer-readable medium storing a set of instructions for wireless communication includes one or more instructions that, when executed by one or more processors of a mobile station, cause the mobile station to transmit first uplink reference signals on a first carrier in a first time slot, switch between the first carrier and a second carrier for uplink transmission in a second time slot, and transmit second uplink reference signals on the first carrier in a third time slot, where, based at least in part on the switching, the transmitting is independent of maintaining phase continuity between the first uplink reference signals and the second uplink reference signals.

In some aspects, an apparatus for wireless communication includes means for generating capability information that indicates a capability of the apparatus to support cross-slot channel estimation based on uplink reference signals across uplink transmissions after switching between a first carrier and a second carrier, based at least in part on the apparatus being capable of supporting cross-slot channel estimation across the uplink transmissions, and means for transmitting the capability information.

In some aspects, an apparatus for wireless communication includes means for receiving first capability information that indicates a capability of a mobile station to support cross-slot channel estimation based on uplink reference signals across uplink transmissions, means for receiving second capability information that indicates a capability of the mobile station to support cross-slot channel estimation based on uplink reference signals across uplink transmissions after switching between a first carrier and a second carrier, and means for transmitting a communication based on channel estimates for uplink transmissions of uplink reference signals on one or more of the first carrier or the second carrier.

In some aspects, an apparatus for wireless communication includes means for transmitting first uplink reference signals on a first carrier in a first time slot, means for switching between the first carrier and a second carrier for uplink transmission; and means for transmitting second uplink reference signals on the first carrier in a third time slot, where, based at least in part on the switching, the transmitting is independent of maintaining phase continuity between the first uplink reference signals and the second uplink reference signals.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 18 is a diagram illustrating an example of uplink transmission on two carriers, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
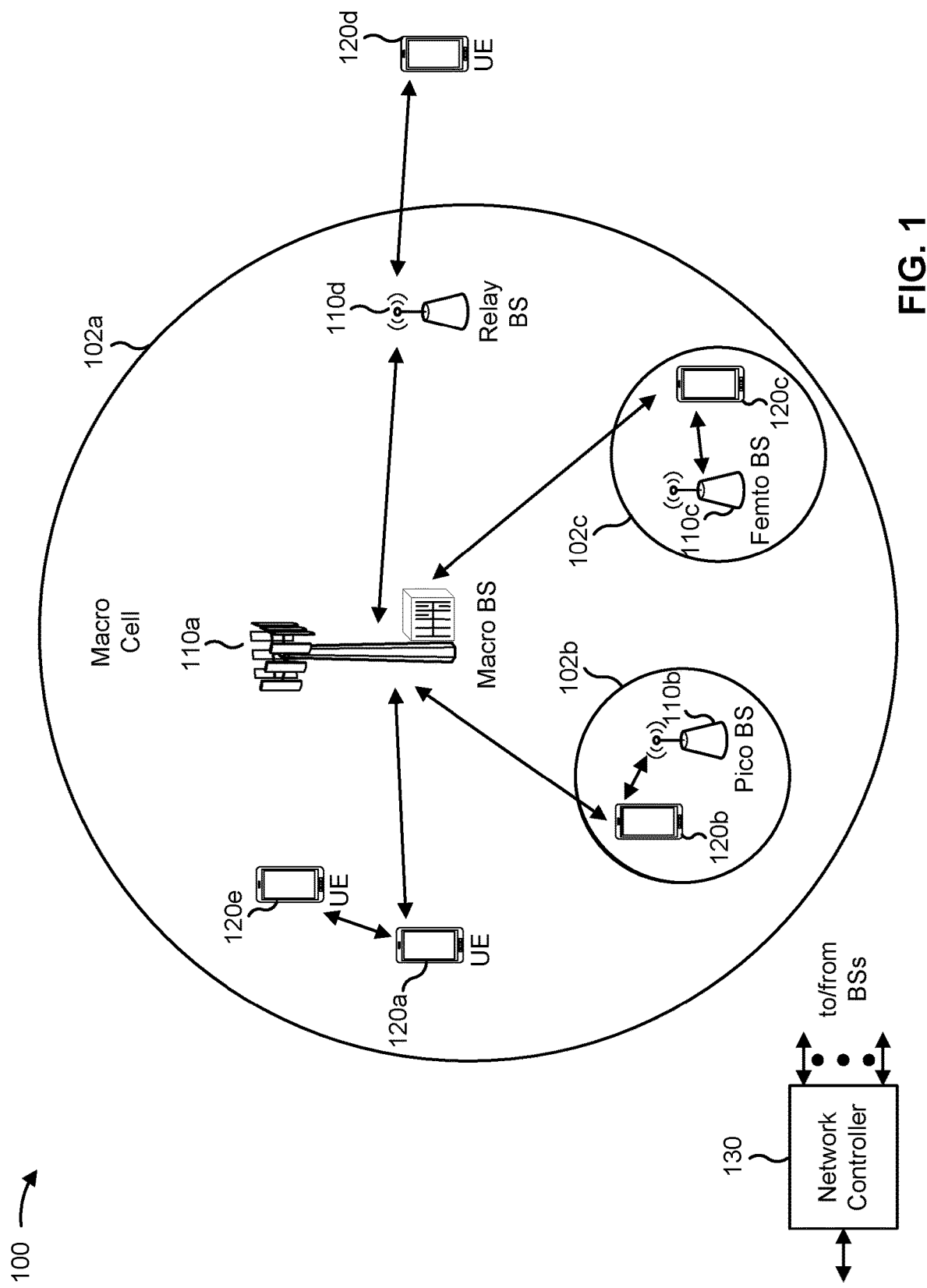
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
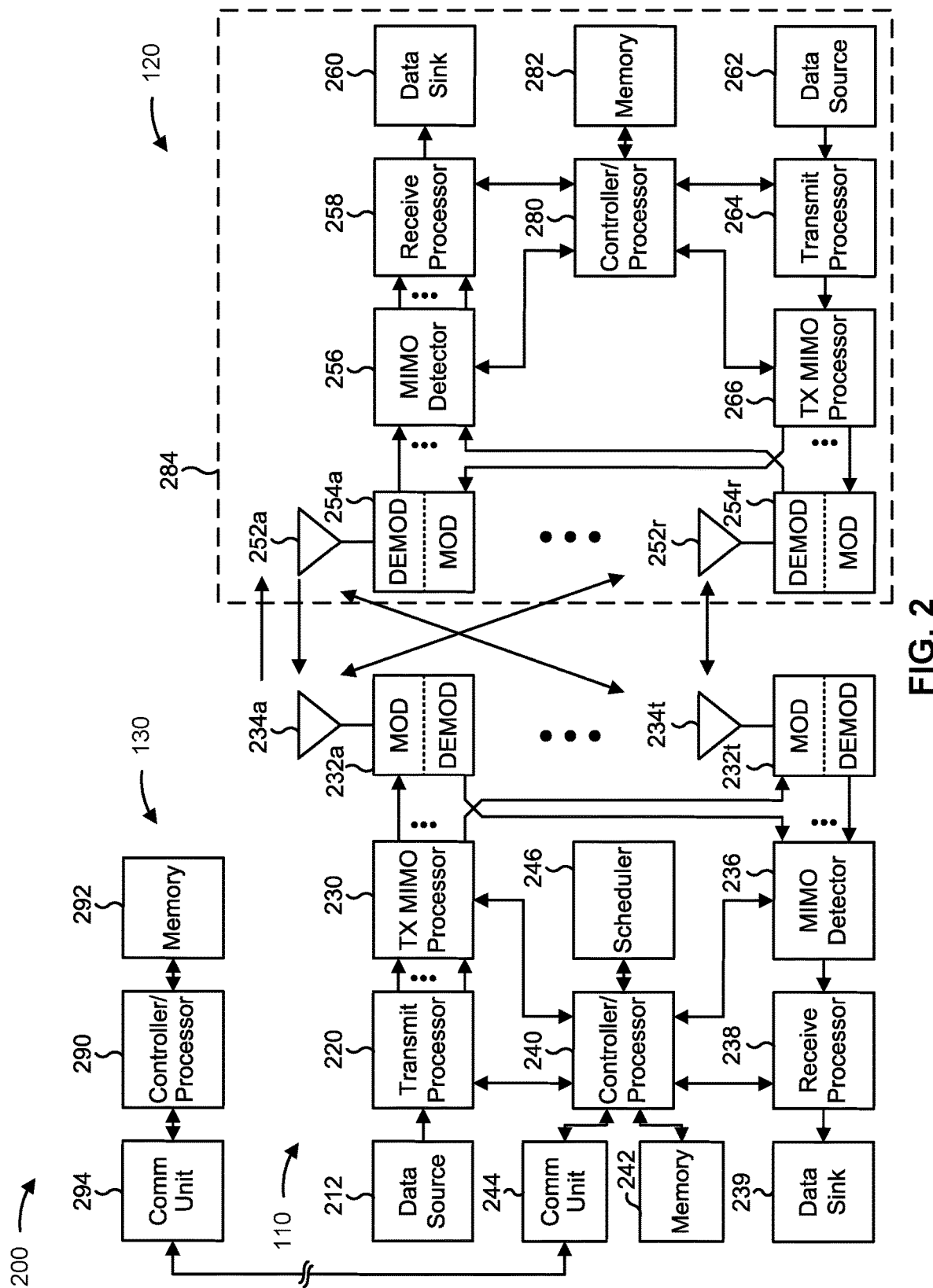
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-25.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-25.

Controller/processor 240 of base station 110, controller/processor 280 of UE 120, and/or any other component(s) of FIG. 2 may perform one or more techniques associated with supporting cross-slot channel estimation of uplink reference signals, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1900 of FIG. 19, process 2000 of FIG. 20, process 2100 of FIG. 21, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, UE 120, and/or base station 110 to perform or direct operations of, for example, process 900 of FIG. 9, process 1000 of FIG. 10, process 1100 of FIG. 11, process 1900 of FIG. 19, process 2000 of FIG. 20, process 2100 of FIG. 21, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, a mobile station (e.g., UE 120) includes means for transmitting, by the mobile station, one or more first uplink reference signals in a first time slot; means for transmitting, by the mobile station, an uplink communication in a second time slot with a bandwidth allocation different than a bandwidth allocation for the one or more first uplink reference signals; means for retuning, by the mobile station, the mobile station during a time gap between the transmitted uplink communication and one or more second uplink reference signals to be transmitted in a third time slot, such that the one or more second uplink reference signals maintain phase continuity with the one or more first uplink reference signals; and/or means for transmitting, by the mobile station, the one or more second uplink reference signals in the third time slot, where the first time slot and the third time slot are uplink transmissions for uplink reference signals. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for determining a duration of the time gap based at least in part on a subcarrier spacing (SCS) for transmitting the one or more first uplink signals, an SCS for transmitting an active uplink bandwidth part for the one or more first uplink signals, an SCS for transmitting the uplink communication, or a fixed SCS indicated by stored configuration information.

In some aspects, the mobile station includes means for determining a quantity of symbols for a duration of the time gap from an indication in stored configuration information.

In some aspects, the mobile station includes means for determining a duration of the time gap based at least in part on a reported mobile station capability.

In some aspects, the mobile station includes means for receiving, from a base station, an indication that the mobile station is to schedule the time gap.

In some aspects, base station 110 includes means for receiving, by base station 110 from a mobile station, an indication of a mobile station capability for retuning to maintain phase continuity of uplink reference signals after transmitting a communication with a different bandwidth allocation; means for transmitting, from base station 110 to the mobile station, scheduling information that indicates a duration of a time gap for the retuning; and/or means for receiving, by base station 110, one or more first uplink reference signals in a first time slot, an uplink communication in a second time slot, and, after the time gap, one or more second uplink reference signals in a third time slot, where the first time slot and the third time slot are uplink transmissions for uplink reference signals. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the mobile station includes means for transmitting, by the mobile station, one or more first uplink reference signals in a first time slot; means for transmitting, by the mobile station, an uplink communication in a second time slot; and/or means for transmitting, by the mobile station, one or more second uplink reference signals in a third time slot, where the transmitting is independent of maintaining phase continuity between the one or more first uplink reference signals and the one or more second uplink reference signals, based at least in part on a bandwidth allocation of the uplink communication being different than a bandwidth allocation for the one or more first uplink reference signals. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for transmitting, by the mobile station, one or more first uplink reference signals in a first time slot; means for determining, by the mobile station, to maintain, after a blank time gap during which no uplink communication is transmitted, phase continuity from the one or more first uplink reference signals to one or more second uplink reference signals to be transmitted in a second time slot, based at least in part on a result of comparing the blank time gap and a blank time gap threshold; and/or means for transmitting, by the mobile station while maintaining phase continuity with the one or more first uplink reference signals, the one or more second uplink reference signals in the second time slot. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for determining a duration of the blank time gap based at least in part on an SCS for transmitting the one or more first uplink signals, an SCS for transmitting an active uplink bandwidth part for the one or more first uplink signals, or a fixed SCS indicated by stored configuration information.

In some aspects, the mobile station includes means for determining a quantity of symbols for a duration of the blank time gap from an indication in stored configuration information.

In some aspects, the mobile station includes means for determining a duration of the blank time gap based at least in part on a reported mobile station capability for maintaining phase continuity between uplink transmissions of uplink reference signals across a blank time gap.

In some aspects, a mobile station (e.g., UE 120) includes means for generating, by the mobile station, capability information that indicates a capability of the mobile station to support cross-slot channel estimation based on uplink reference signals across uplink transmissions after switching between a first carrier and a second carrier, based at least in part on the mobile station being capable of supporting cross-slot channel estimation across the uplink transmissions, and/or means for transmitting, by the mobile station, the capability information. The first carrier and a second carrier may be combined for uplink inter-band carrier aggregation or uplink intra-band carrier aggregation. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, base station 110 includes means for receiving, by the base station from a mobile station, first capability information that indicates a capability of the mobile station to support cross-slot channel estimation based on uplink reference signals across uplink transmissions and to support uplink carrier switching between the uplink transmissions, means for receiving, by the base station from the mobile station, second capability information that indicates a capability of the mobile station to support cross-slot channel estimation based on uplink reference signals across uplink transmissions after switching between a first carrier and a second carrier, and/or means for transmitting, by the base station to the mobile station, a communication based on channel estimates for uplink transmissions of uplink reference signals on one or more of the first carrier or the second carrier. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the mobile station includes means for transmitting, by the mobile station, first uplink reference signals on a first carrier in a first time slot, means for switching, by the mobile station in a second time slot, between the first carrier and a second carrier for uplink transmission, and/or means for transmitting, by the mobile station, second uplink reference signals on the first carrier in a third time slot, where, based at least in part on the switching, the transmitting is independent of maintaining phase continuity between the first uplink reference signals and the second uplink reference signals. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Uplink channels and uplink reference signals may carry information from a UE to a base station. An uplink channel may include a physical uplink control channel (PUCCH) that carries uplink control information (UCI), a physical uplink shared channel (PUSCH) that carries uplink data, or a physical random access channel (PRACH) used for initial network access, among other examples. An uplink reference signal may include a sounding reference signal (SRS), a DMRS, or a phase tracking reference signal (PTRS), among other examples.

An SRS may carry information used for uplink channel estimation, which may be used for scheduling, link adaptation, precoder selection, or beam management, among other examples. A base station may configure one or more SRS resource sets for a UE, and the UE may transmit SRSs on the configured SRS resource sets. An SRS resource set may have a configured usage, such as uplink channel state information (CSI) acquisition, downlink CSI acquisition for reciprocity-based operations, uplink beam management, among other examples. The base station may measure the SRSs, may perform channel estimation based at least in part on the measurements, and may use the SRS measurements to configure communications with the UE.

Downlink channels and downlink reference signals may carry information from a base station to a UE. A downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. A downlink reference signal may include a synchronization signal block (SSB), a CSI reference signal (CSI-RS), a DMRS, a positioning reference signal (PRS), or a PTRS, among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. DMRSs may be used for both downlink communications and uplink communications.

Figure 3:
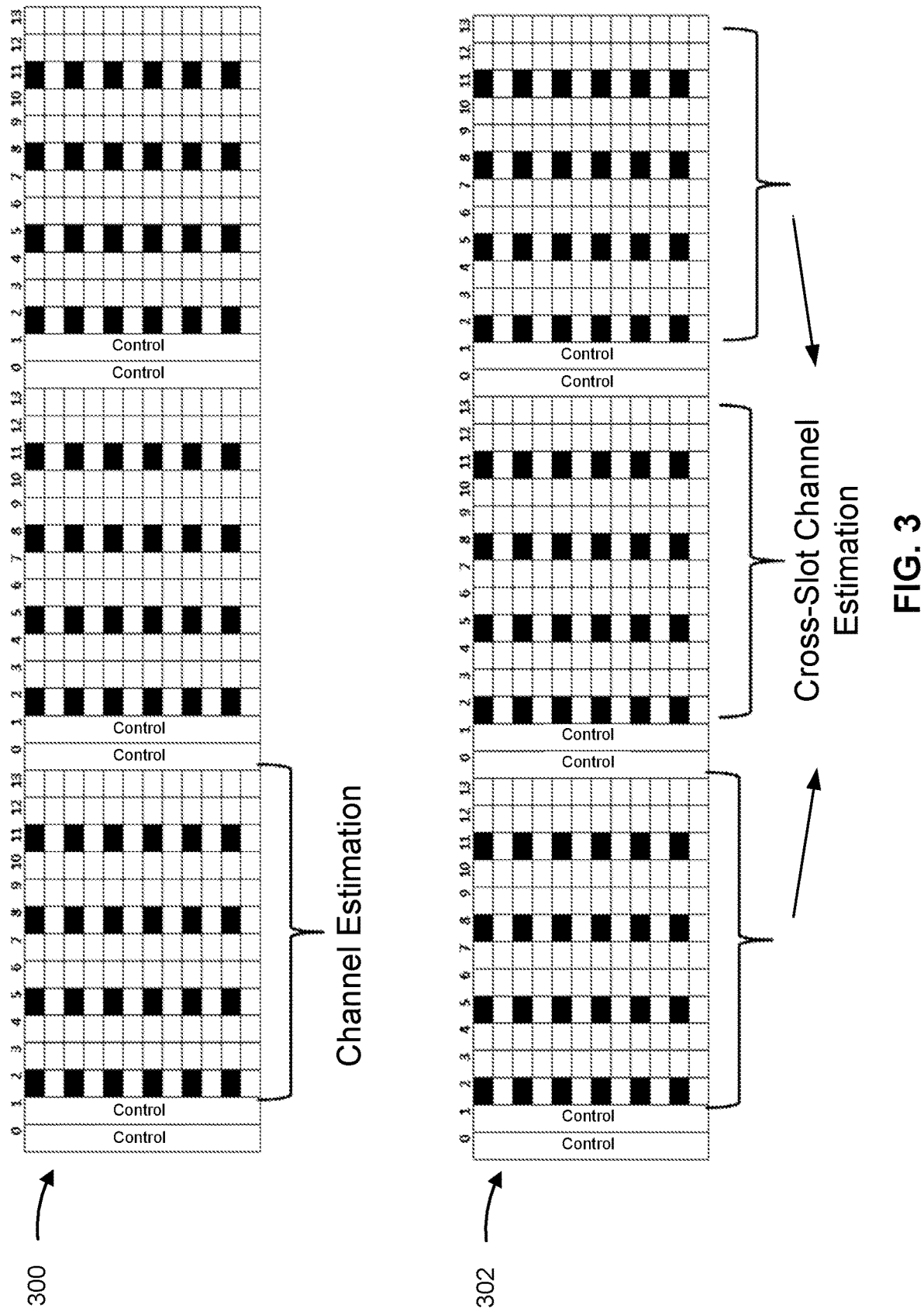
FIG. 3 is a diagram illustrating examples of channel estimation, in accordance with the present disclosure.

FIG. 3 is a diagram illustrating examples 300 and 302 of channel estimation, in accordance with the present disclosure.

Example 300 shows three slots of transport blocks. A receiving UE (or a receiving base station) may use DMRSs in each transport block for channel estimation. That is, channel estimation is performed for each slot, separately. Example 302 shows joint channel estimation, using DMRSs of the three transport blocks together. This may be referred to as "cross-slot channel estimation," "DMRS bundling," or "joint channel estimation." Cross-slot channel estimation may improve the accuracy of channel estimation, because the estimates involve information across multiple slots.

As indicated above, FIG. 3 provides some examples. Other examples may differ from what is described with regard to FIG. 3.

Figure 4:
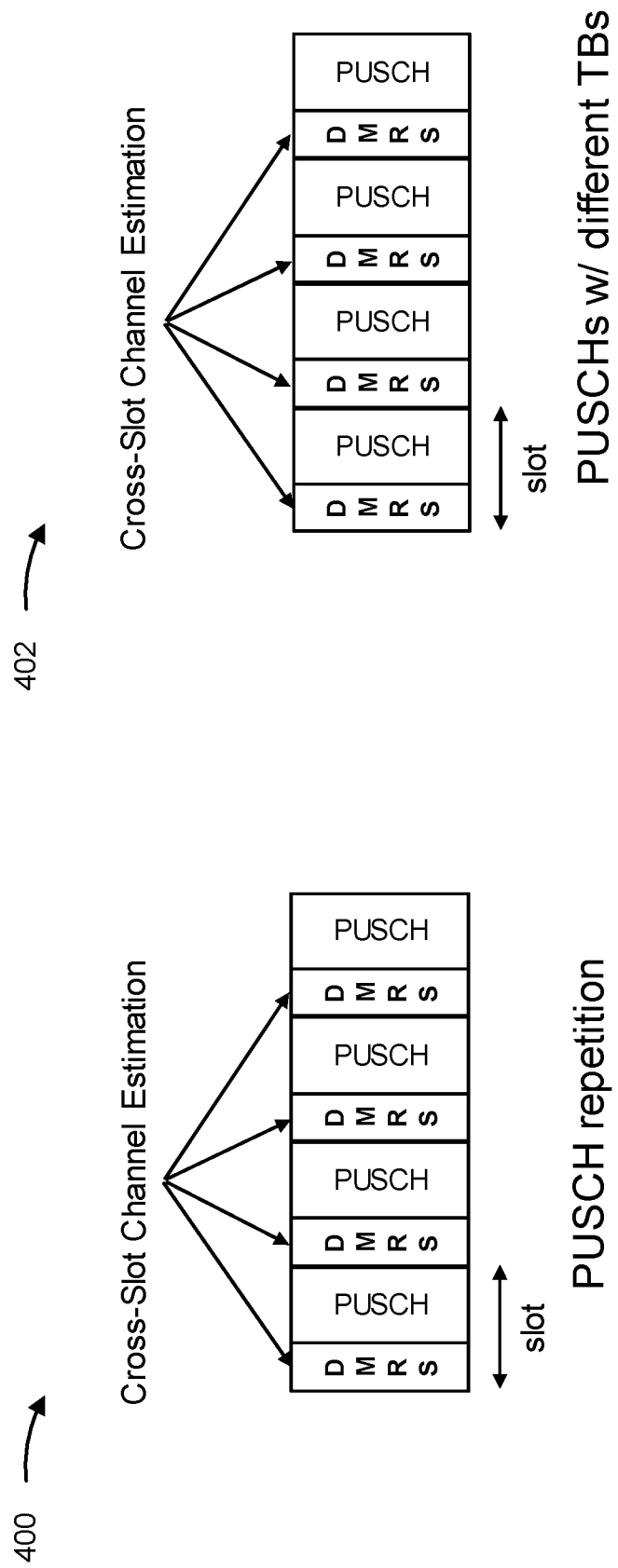
FIG. 4 is a diagram illustrating examples of consecutive slots for cross-slot channel estimation, in accordance with the present disclosure.

FIG. 4 is a diagram illustrating examples 400 and 402 of slots for cross-slot channel estimation, in accordance with the present disclosure.

In order for cross-slot channel estimation to be effective, DMRSs across the slots are to maintain phase continuity. In other words, DMRSs of the same channel estimation process are to have phase coherence from slot to slot. Phase coherence may include phase continuity in the frequency domain across consecutive slots. Signals may have a same phase if the signals have the same frequency and the maxima and minima of the signals are aligned. Signals may be phase coherent if a phase difference between the signals is the same. Maintaining phase continuity may also be referred to as "coherent transmission."

The DMRSs in examples 400 and 402 may be for consecutive slots of physical uplink channels, such as for PUSCH DMRSs or PUCCH DMRSs. Consecutive slots may be contiguous slots, such as shown by examples 400 and 402. Cross-slot channel estimation may be performed for repetitions of physical uplink channels or for repetitions of SRSs, as shown by example 400. Cross-slot channel estimation may also be performed for physical uplink channels carrying different transport blocks, as shown by example 402.

As indicated above, FIG. 4 provides some examples. Other examples may differ from what is described with regard to FIG. 4.

Figure 5:
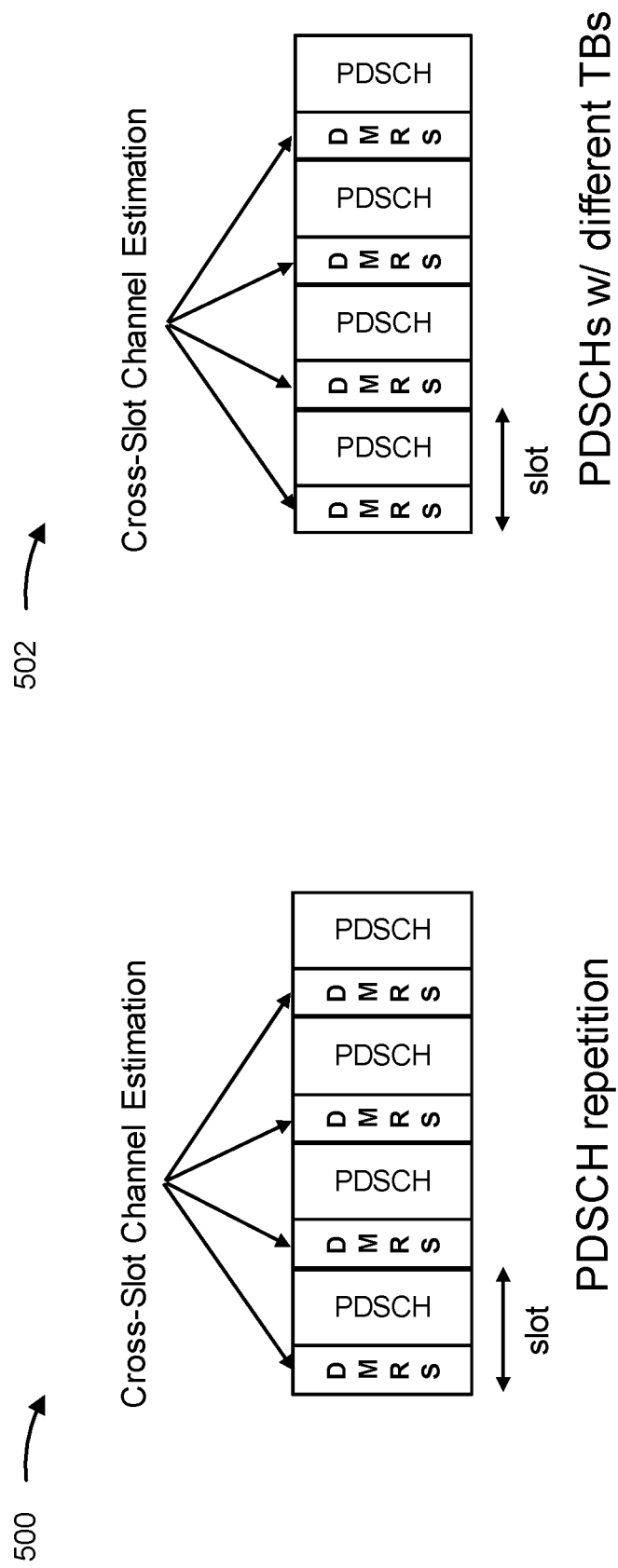
FIG. 5 is a diagram illustrating examples of consecutive slots for cross-slot channel estimation, in accordance with the present disclosure.

FIG. 5 is a diagram illustrating examples 500 and 502 of slots for cross-slot channel estimation, in accordance with the present disclosure.

While FIG. 4 shows that cross-slot channel estimation may be for physical uplink channels, FIG. 5 shows that cross-slot channel estimation may also be performed for physical downlink channels, such as for PDSCH DMRSs or PDCCH DMRSs. For example, cross-slot channel estimation may be performed for repetitions of physical downlink channels, as shown by example 500. Cross-slot channel estimation may also be performed for physical downlink channels carrying different transport blocks, as shown by example 502.

As indicated above, FIG. 5 provides some examples. Other examples may differ from what is described with regard to FIG. 5.

Figure 6:
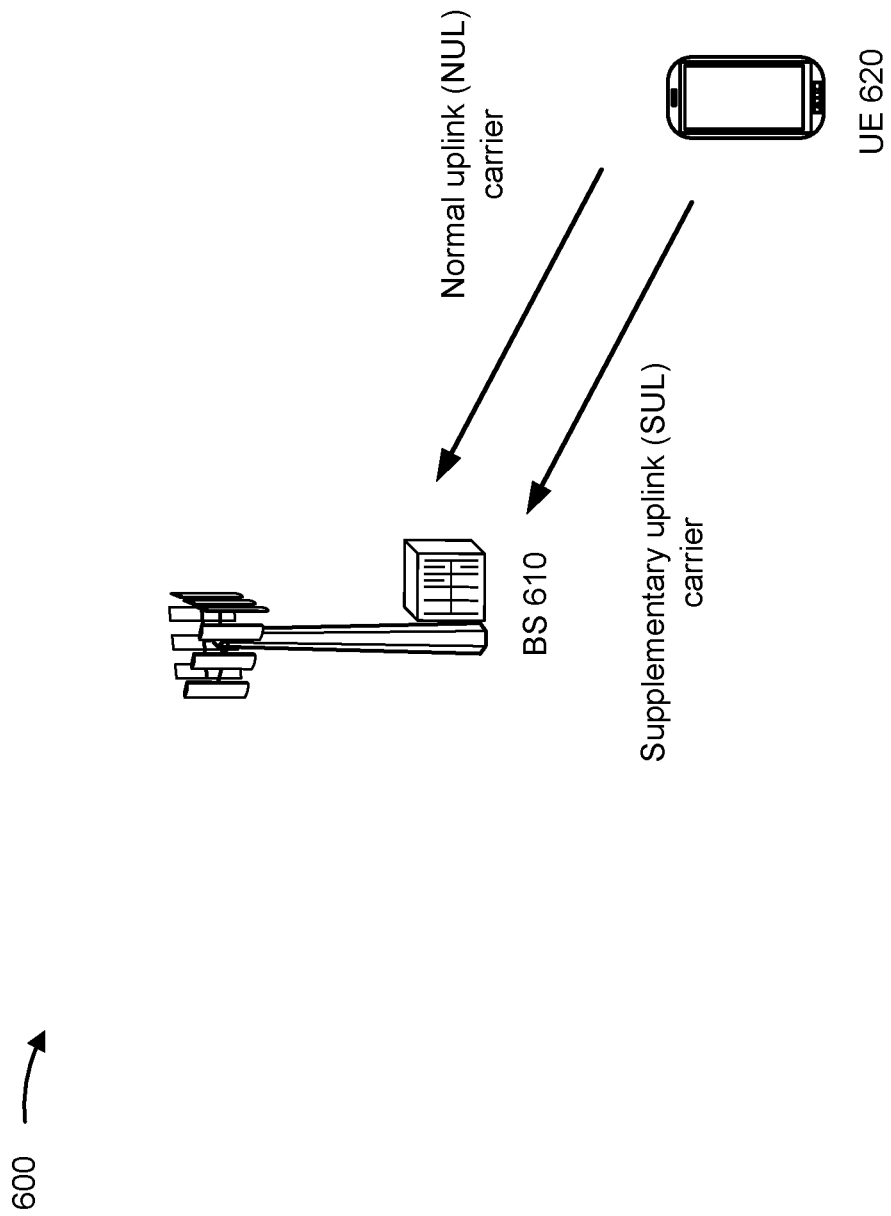
FIG. 6 is a diagram illustrating an example of uplink carriers, in accordance with the present disclosure.

FIG. 6 is a diagram illustrating an example 600 of uplink carriers, in accordance with the present disclosure. As shown in FIG. 6, a base station (BS) 610 (e.g., BS 110) may communicate (e.g., transmit an uplink transmission and/or receive a downlink transmission) with a UE 620 (e.g., UE 120). UE 620 and base station 610 may be part of a wireless network (e.g., wireless network 100). UE 620 may be referred to as a "mobile station."

UE 620 may establish and transmit uplink transmissions on a normal uplink (NUL) carrier to BS 610. UE 620 may also establish and transmit uplink transmissions on a supplementary uplink (SUL) carrier, in addition to the NUL carrier. The SUL carrier may be configured to complement the NUL carrier on a serving cell for improving uplink throughput, coverage, and reliability. The NUL carrier may be in 3.5 GHz while the SUL carrier may be in 2 GHz. UE 620 may dynamically switch between the NUL carrier and the SUL carrier by an indication in downlink control information (DCI), as UE 620 may not simultaneously transmit on both the NUL carrier and the SUL carrier. For example, UE 620 may switch from uplink on the NUL carrier in slot 4 to the SUL carrier for slots 5-7 and switch back to the NUL carrier for slots 8 and 9.

UE 620 may be configured to support cross-slot channel estimation on a SUL carrier, but BS 610 may not be aware of UE 620's capability of supporting cross-slot channel estimation on the SUL carrier. As a result, BS 610 may not obtain accurate channel estimates if the SUL carrier is used, even though UE 620 is able to support cross-channel estimation on the SUL carrier. Conversely, BS 610 may not obtain accurate channel estimates if BS 610 is expecting to use cross-slot channel estimation on the SUL carrier but UE 620 does not support such cross-slot estimation. Such support mismatches and inaccurate channel estimation may degrade communications.

As indicated above, FIG. 6 is provided as an example. Other examples may differ from what is described with regard to FIG. 6.

Figure 7:
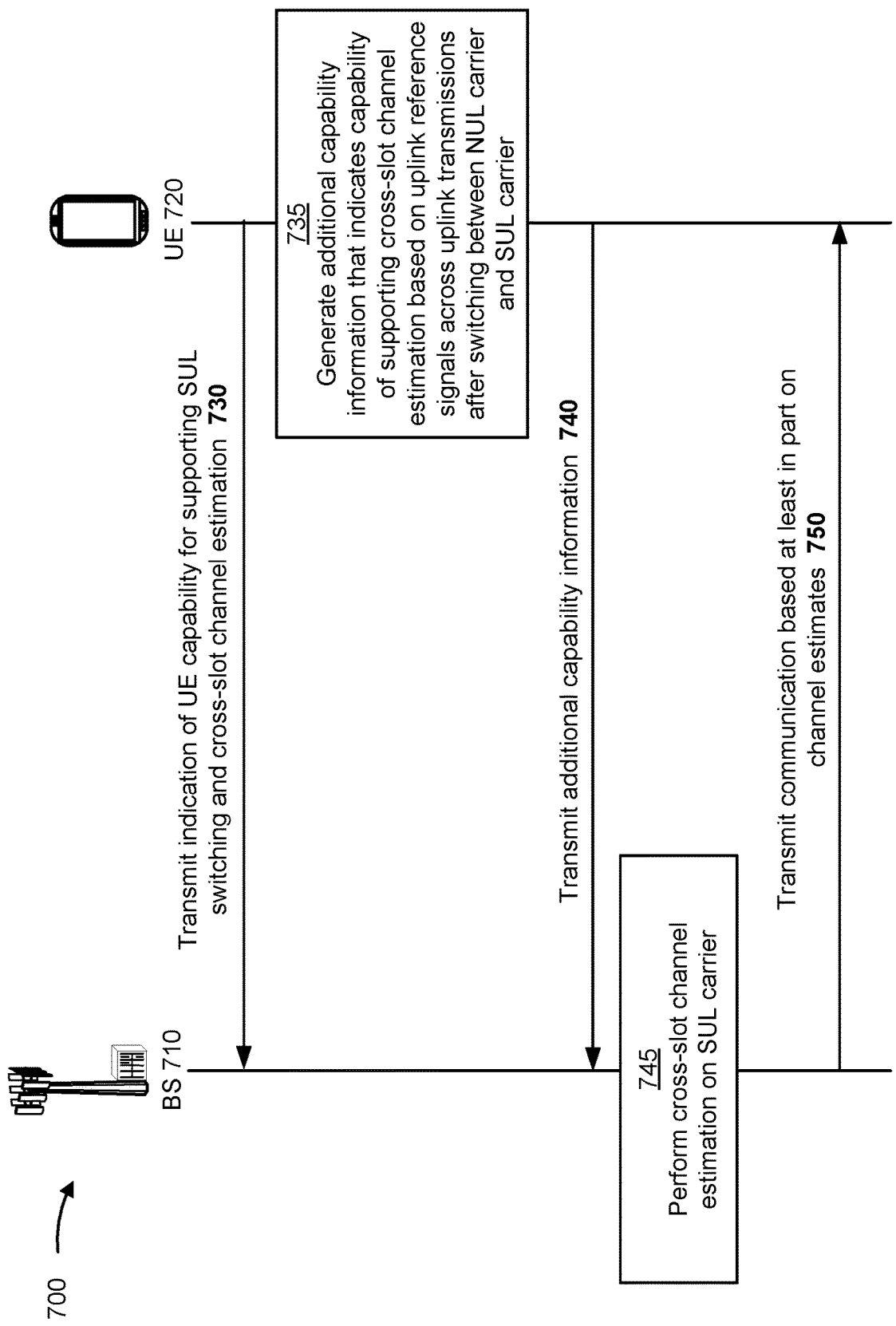
FIG. 7 is a diagram illustrating an example of signaling support for cross-slot channel estimation on uplink carriers, in accordance with the present disclosure.

FIG. 7 is a diagram illustrating an example 700 of signaling support for cross-slot channel estimation on uplink carriers, in accordance with the present disclosure. As shown in FIG. 7, a base station 710 (e.g., BS 110) may communicate (e.g., transmit an uplink transmission and/or receive a downlink transmission) with a UE 720 (e.g., UE 120). UE 720 and base station 710 may be part of a wireless network (e.g., wireless network 100).

The UE 720 may transmit an indication of a UE capability for supporting cross-slot channel estimation of uplink reference signals across uplink transmissions after switching between a first carrier and a second carrier. In some aspects, the first carrier and the second carrier are combined for uplink carrier aggregation, which may be inter-band carrier aggregation or intra-band carrier aggregation. In some aspects, as an example of intra-band carrier aggregation, the first carrier may be a NUL carrier and the second carrier may be a SUL carrier.

Example 700 shows switching between a NUL carrier and a SUL carrier, as an example of switching between a first carrier and a second carrier. As shown by reference number 730, UE 720 may transmit an indication of a UE capability for supporting SUL switching and cross-slot channel estimation on a SUL carrier. As shown by reference number 735, UE 720 may generate additional capability information that indicates a capability of UE 720 to support cross-slot channel estimation of uplink reference signals across uplink transmissions after switching between a NUL carrier and the SUL carrier. Time slots of uplink reference signals may be considered to be "uplink transmissions of uplink reference signals" if the time slots are a time slot of uplink reference signals on a carrier and a next time slot of uplink reference signals on the same carrier. There may be other intervening communications that are not uplink reference signals on the same carrier.

As shown by reference number 740, UE 720 may transmit the additional capability information to BS 710. In some aspects, UE 720 may indicate additional capability information per frequency band combination. A carrier may operate in a frequency band, which may have different channel and traffic conditions than another frequency band. UE 720 may transmit on carriers that are located in a combination of frequency bands, and the capability of UE 720 may vary based at least in part on the combination of frequency bands. Accordingly, UE 720 may indicate a capability per frequency band combination.

BS 710 may use the additional capability information. As shown by reference number 745, BS 710 may perform cross-slot channel estimation on the SUL carrier if supported by UE 720. BS 710 may not perform cross-slot channel estimation on the SUL carrier if not supported by UE 720. As shown by reference number 750, BS 710 may transmit a communication that is based at least in part on channel estimates on the SUL carrier.

In some aspects, if UE 720 is not scheduled to switch from a first carrier to a second carrier for uplink transmission between consecutive physical uplink transmissions (e.g., PUSCH, PUCCH) on the first carrier, UE 720 may not maintain phase continuity between the two consecutive physical uplink transmissions on the first carrier. The first carrier may be a SUL carrier and the second carrier may be a NUL carrier. Alternatively, the first carrier may be a NUL carrier and the second carrier may be a SUL carrier.

As indicated above, FIG. 7 is provided as an example. Other examples may differ from what is described with regard to FIG. 7.

Figure 8:
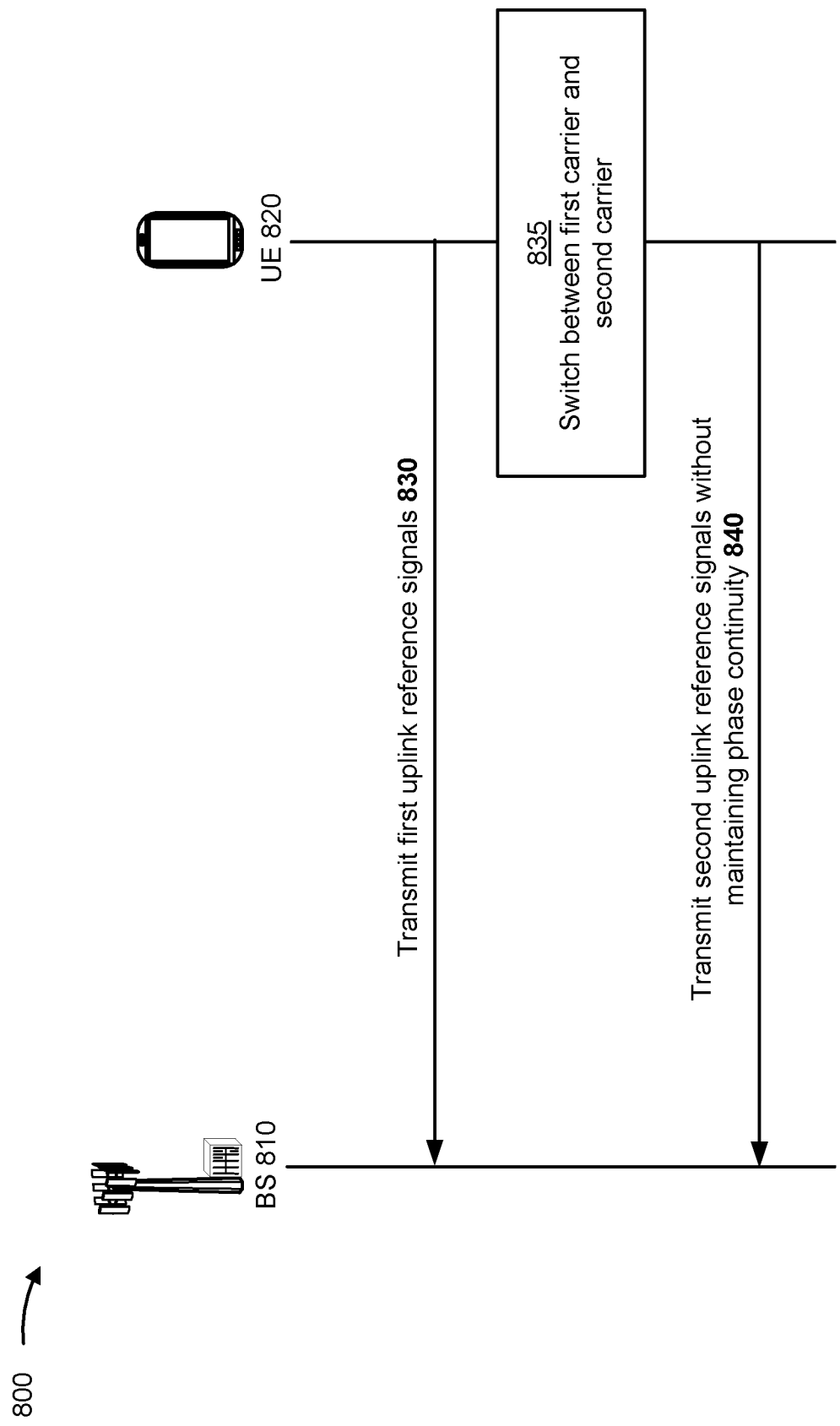
FIG. 8 is a diagram illustrating an example of switching uplink carriers, in accordance with the present disclosure

FIG. 8 is a diagram illustrating an example 800 of switching uplink carriers, in accordance with the present disclosure. As shown in FIG. 8, a base station 810 (e.g., BS 110) may communicate (e.g., transmit an uplink transmission and/or receive a downlink transmission) with a UE 820 (e.g., UE 120). UE 820 and base station 810 may be part of a wireless network (e.g., wireless network 100). UE 820 may be referred to as a "mobile station."

If UE 820 is capable of switching uplink carriers and supporting cross-slot channel estimation, UE 820 may switch uplink carriers. As shown by reference number 830, UE 820 may transmit first uplink reference signals. UE 820 may transmit the first uplink reference signals in a first time slot.

As shown by reference number 835, UE 820 may switch between the first carrier and the second carrier. This may involve returning to a different frequency band for uplink transmission in a second time slot. The switch may be during the second time slot. The first carrier and the second carrier may be in carrier aggregation. One of the carriers may be a SUL carrier.

As shown by reference number 840, UE 820 may transmit second uplink reference signals. The second uplink signals may be transmitted on the second carrier in a third time slot. UE 820 may transmit the second uplink reference signals without maintaining phase continuity, or independent of maintaining phase continuity between the first uplink reference signals and the second uplink reference signals. UE 820 may not maintain phase continuity based at least in part on the switching of the carriers.

As indicated above, FIG. 8 is provided as an example. Other examples may differ from what is described with regard to FIG. 8.

Figure 9:
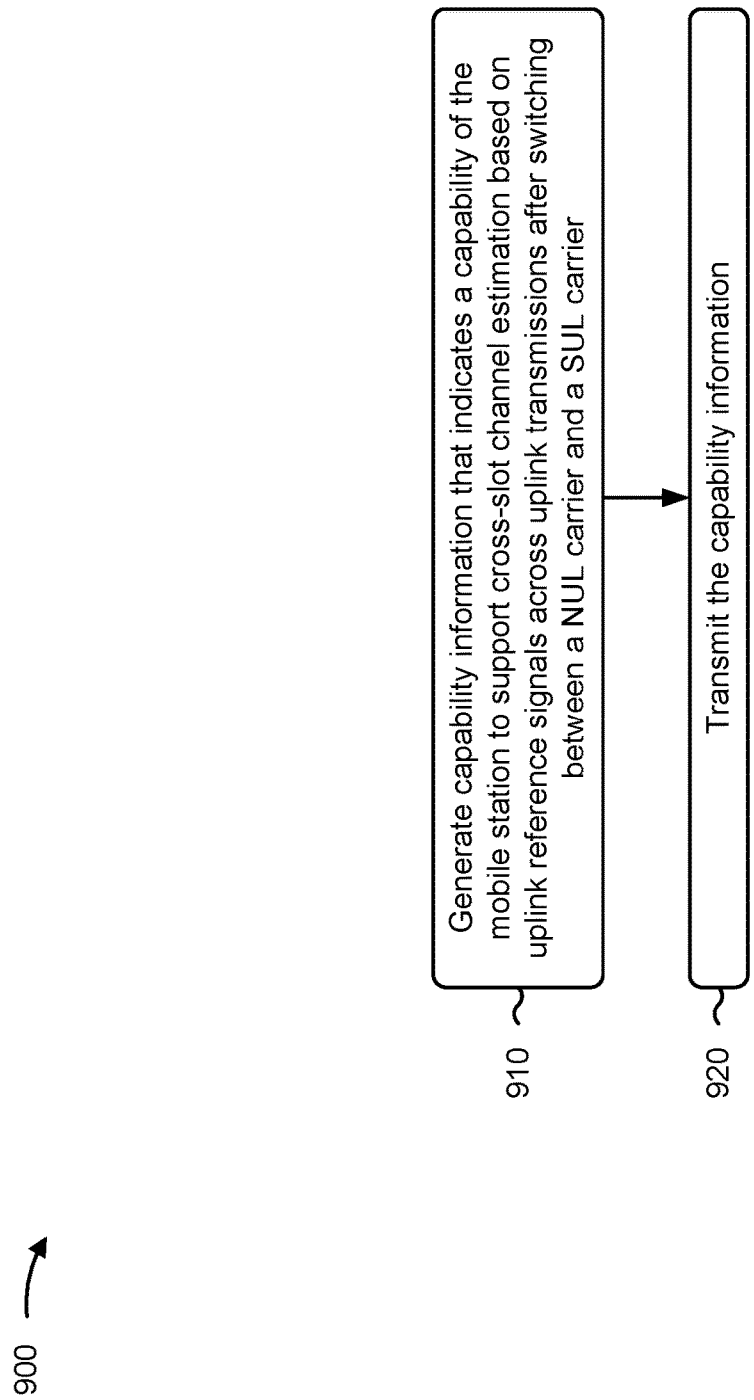
FIG. 9 is a diagram illustrating an example process performed, for example, by a mobile station, in accordance with the present disclosure.

FIG. 9 is a diagram illustrating an example process 900 performed, for example, by a mobile station, in accordance with the present disclosure. Example process 900 is an example where the mobile station (e.g., UE 120 depicted in FIGS. 1-2, UE 620 in FIG. 6, UE 720 in FIG. 7) performs operations associated with cross-slot channel estimation of uplink reference signals with SUL switching.

As shown in FIG. 9, in some aspects, process 900 may include generating capability information that indicates a capability of the mobile station to support cross-slot channel estimation based on uplink reference signals across uplink transmissions (or consecutive time slots) after switching between a NUL carrier and a SUL carrier, based at least in part on the mobile station being capable of supporting cross-slot channel estimation across the uplink transmissions (or the consecutive time slots) and being capable of switching to or from the SUL carrier (block 910). For example, the mobile station (e.g., using generation component 1208 depicted in FIG. 12) may generate capability information that indicates a capability of the mobile station to support cross-slot channel estimation based on uplink reference signals across uplink transmissions (or consecutive time slots) after switching between a NUL carrier and a SUL carrier, based at least in part on the mobile station being capable of supporting cross-slot channel estimation across the uplink transmissions (or the consecutive time slots) and being capable of switching to or from the SUL carrier, as described above. In some aspects, uplink transmissions may include consecutive uplink transmissions or uplink transmissions in consecutive time slots. In some aspects, the uplink transmissions comprise transmissions of a PUSCH.

As further shown in FIG. 9, in some aspects, process 900 may include transmitting the capability information (block 920). For example, the mobile station (e.g., using transmission component 1204 depicted in FIG. 12) may transmit the capability information, as described above.

Process 900 may include additional aspects, such as any single aspect or any combination of aspects described below and/or in connection with one or more other processes described elsewhere herein.

In a first aspect, the capability information indicates that the mobile station is capable of supporting cross-slot channel estimation across uplink transmissions on the NUL carrier and not the SUL carrier.

In a second aspect, alone or in combination with the first aspect, the capability information indicates that the mobile station is capable of supporting cross-slot channel estimation across uplink transmissions on the SUL carrier and not the NUL carrier.

In a third aspect, alone or in combination with one or more of the first and second aspects, the capability information indicates that the mobile station is capable of supporting cross-slot channel estimation across uplink transmissions on the SUL carrier and supporting cross-slot channel estimation across uplink transmissions on the NUL carrier.

In a fourth aspect, alone or in combination with one or more of the first through third aspects, the uplink reference signals comprise DMRSs of a PUSCH.

In a fifth aspect, alone or in combination with one or more of the first through fourth aspects, the uplink reference signals comprise DMRSs of a PUCCH.

In a sixth aspect, alone or in combination with one or more of the first through fifth aspects, the uplink reference signals comprise SRSs.

In a seventh aspect, alone or in combination with one or more of the first through sixth aspects, the capability information indicates the capability of the mobile station to support cross-slot channel estimation per combination of frequency bands.

In an eighth aspect, alone or in combination with one or more of the first through seventh aspects, supporting cross-slot channel estimation comprises maintaining phase continuity of the uplink reference signals of the uplink transmissions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
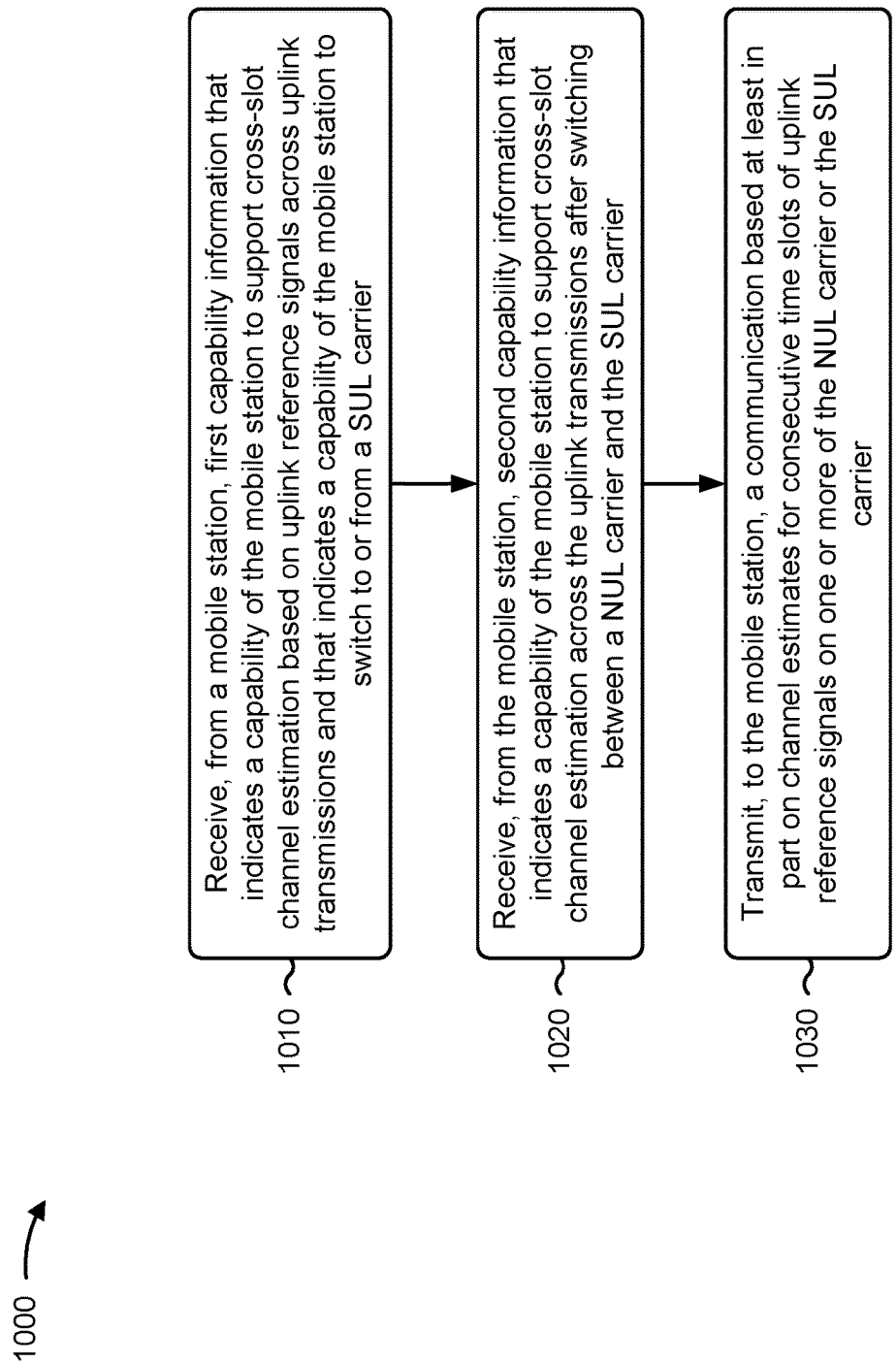
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110 depicted in FIGS. 1-2, BS 610 depicted in FIG. 6, BS 710 depicted in FIG. 7) performs operations associated with cross-slot channel estimation of uplink reference signals with a SUL carrier.

As shown in FIG. 10, in some aspects, process 1000 may include receiving first capability information that indicates a capability of the mobile station to support cross-slot channel estimation based on uplink reference signals across uplink transmissions (or consecutive time slots) and that indicates a capability of the mobile station to switch to or from a SUL carrier (block 1010). For example, the base station (e.g., using reception component 1302 depicted in FIG. 13) may receive first capability information that indicates a capability of the mobile station to support cross-slot channel estimation based on uplink reference signals across uplink transmissions (or consecutive time slots) and that indicates a capability of the mobile station to switch to or from a SUL carrier, as described above. In some aspects, uplink transmissions may include consecutive uplink transmissions or uplink transmissions in consecutive time slots.

As further shown in FIG. 10, in some aspects, process 1000 may include receiving second capability information that indicates a capability of the mobile station to support cross-slot channel estimation across the uplink transmissions (or the consecutive time slots) after switching between a NUL carrier and the SUL carrier (block 1020). For example, the base station (e.g., using reception component 1302 depicted in FIG. 13) may receive second capability information that indicates a capability of the mobile station to support cross-slot channel estimation across the uplink transmissions (or the consecutive time slots) after switching between a NUL carrier and the SUL carrier, as described above.

As further shown in FIG. 10, in some aspects, process 1000 may include transmitting a communication based at least in part on channel estimates for uplink transmissions of uplink reference signals on one or more of the NUL carrier or the SUL carrier (block 1030). For example, the base station (e.g., using transmission component 1304 depicted in FIG. 13) may transmit a communication based at least in part on channel estimates for uplink transmissions of uplink reference signals on one or more of the NUL carrier or the SUL carrier, as described above.

Process 1000 may include additional aspects, such as any single aspect or any combination of aspects described below and/or in connection with one or more other processes described elsewhere herein.

In a first aspect, the capability information indicates that the mobile station is capable of supporting cross-slot channel estimation across uplink transmissions on the NUL carrier and not the SUL carrier.

In a second aspect, alone or in combination with the first aspect, the capability information indicates that the mobile station is capable of supporting cross-slot channel estimation across uplink transmissions on the SUL carrier and not the NUL carrier.

In a third aspect, alone or in combination with one or more of the first and second aspects, the capability information indicates that the mobile station is capable of supporting cross-slot channel estimation across uplink transmissions on the SUL carrier and supporting cross-slot channel estimation across uplink transmissions on the NUL carrier.

In a fourth aspect, alone or in combination with one or more of the first through third aspects, the uplink reference signals comprise DMRSs of a PUSCH.

In a fifth aspect, alone or in combination with one or more of the first through fourth aspects, the uplink reference signals comprise DMRSs of a PUCCH.

In a sixth aspect, alone or in combination with one or more of the first through fifth aspects, the uplink reference signals comprise SRSs.

In a seventh aspect, alone or in combination with one or more of the first through sixth aspects, the capability information indicates the capability of the mobile station to support cross-slot channel estimation per combination of frequency bands.

In an eighth aspect, alone or in combination with one or more of the first through seventh aspects, supporting cross-slot channel estimation comprises maintaining phase continuity of the uplink reference signals of the uplink transmissions.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
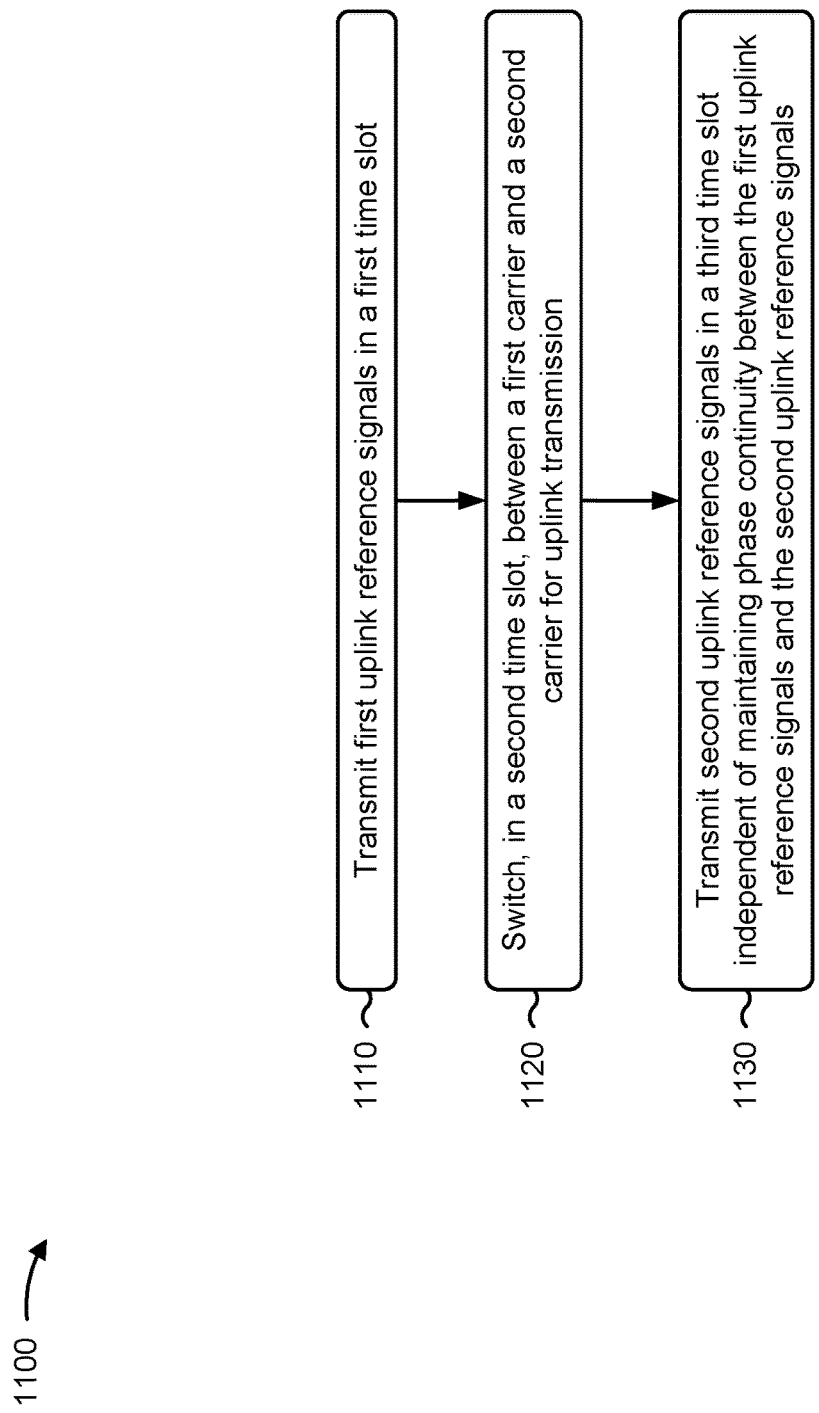
FIG. 11 is a diagram illustrating an example process performed, for example, by a mobile station, in accordance with the present disclosure.

FIG. 11 is a diagram illustrating an example process 1100 performed, for example, by a mobile station, in accordance with the present disclosure. Example process 1100 is an example where the mobile station (e.g., UE 120 depicted in FIGS. 1-2, UE 620 depicted in FIG. 6, UE 820 depicted in FIG. 8) performs operations associated with cross-slot channel estimation of uplink reference signals with a SUL carrier.

As shown in FIG. 11, in some aspects, process 1100 may include transmitting first uplink reference signals in a first time slot (block 1110). For example, the mobile station (e.g., using transmission component 1404 depicted in FIG. 14) may transmit first uplink reference signals in a first time slot, as described above.

As further shown in FIG. 11, in some aspects, process 1100 may include switching between a first carrier and a second carrier for uplink transmission (block 1120). For example, the mobile station (e.g., using switching component 1408 depicted in FIG. 14) may switch, in a second time slot, between a first carrier and a second carrier for uplink transmission, as described above. In some aspects, the first carrier or the second carrier is a SUL carrier.

As further shown in FIG. 11, in some aspects, process 1100 may include transmitting second uplink reference signals in a third time slot (block 1130). For example, the mobile station (e.g., using transmission component 1404 depicted in FIG. 14) may transmit second uplink reference signals in a third time slot, as described above. In some aspects, based at least in part on the switching, the transmitting is independent of maintaining phase continuity between the first uplink reference signals and the second uplink reference signals.

Process 1100 may include additional aspects, such as any single aspect or any combination of aspects described below and/or in connection with one or more other processes described elsewhere herein.

In a first aspect, the first uplink reference signals and the second uplink reference signals comprise DMRSs of a PUSCH.

In a second aspect, alone or in combination with the first aspect, the first uplink reference signals and the second uplink reference signals comprise DMRSs of a PUCCH.

In a third aspect, alone or in combination with one or more of the first and second aspects, the first uplink reference signals and the second uplink reference signals comprise SRSs.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
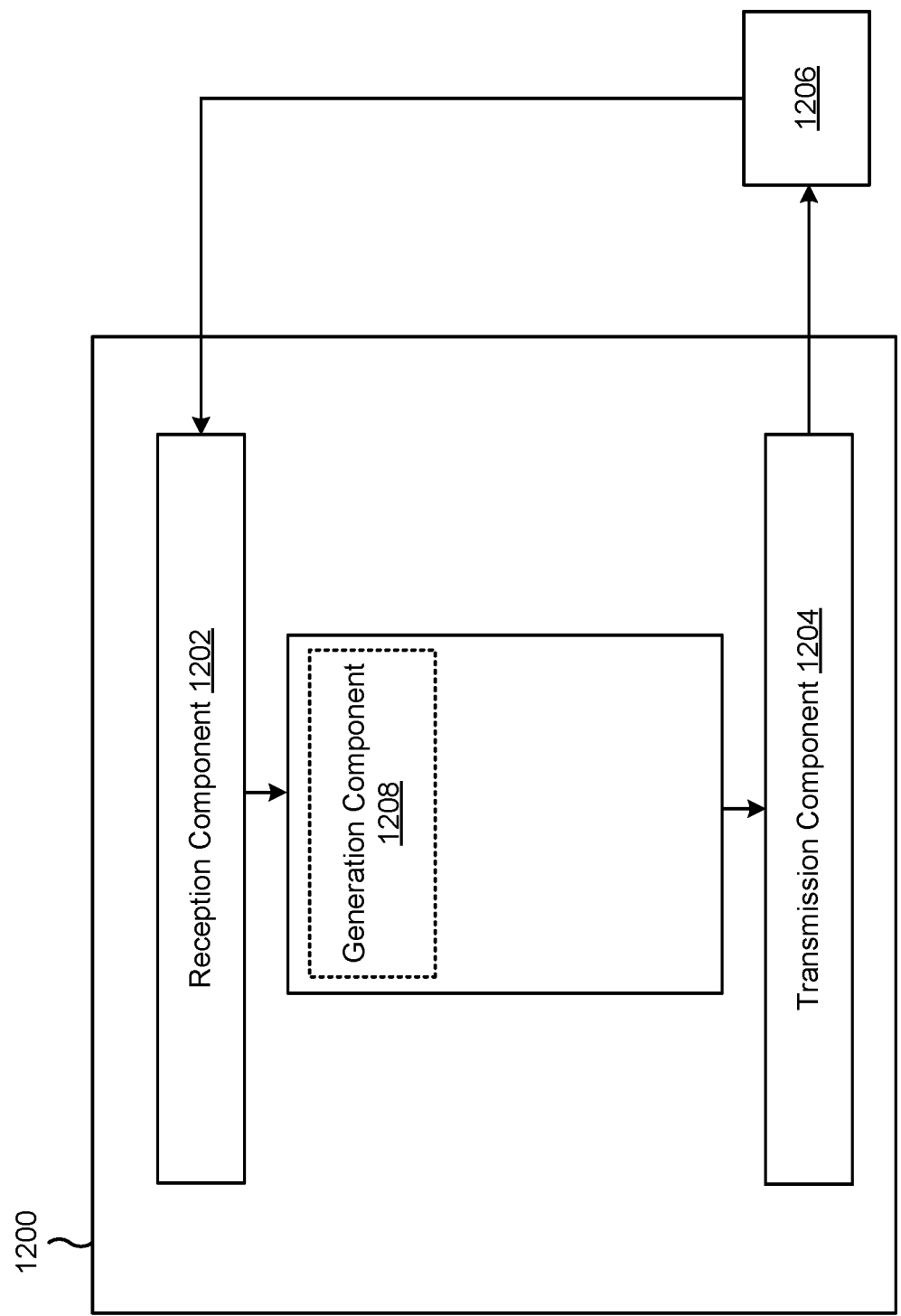
FIGS. 12-14 are block diagrams of example apparatuses for wireless communication, in accordance with the present disclosure.

FIG. 12 is a block diagram of an example apparatus 1200 for wireless communication. The apparatus 1200 may be a mobile station, such as a UE, or a mobile station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a generation component 1208, among other examples.

In some aspects, the apparatus 1200 may be configured to perform one or more operations described herein in connection with FIGS. 1-8. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The generation component 1208 may generate capability information that indicates a capability of the mobile station to support cross-slot channel estimation based on uplink reference signals across uplink transmissions after switching between a NUL carrier and a SUL carrier, based at least in part on the mobile station being capable of supporting cross-slot channel estimation across the uplink transmissions and being capable of switching to or from the SUL carrier. The transmission component 1204 may transmit the capability information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
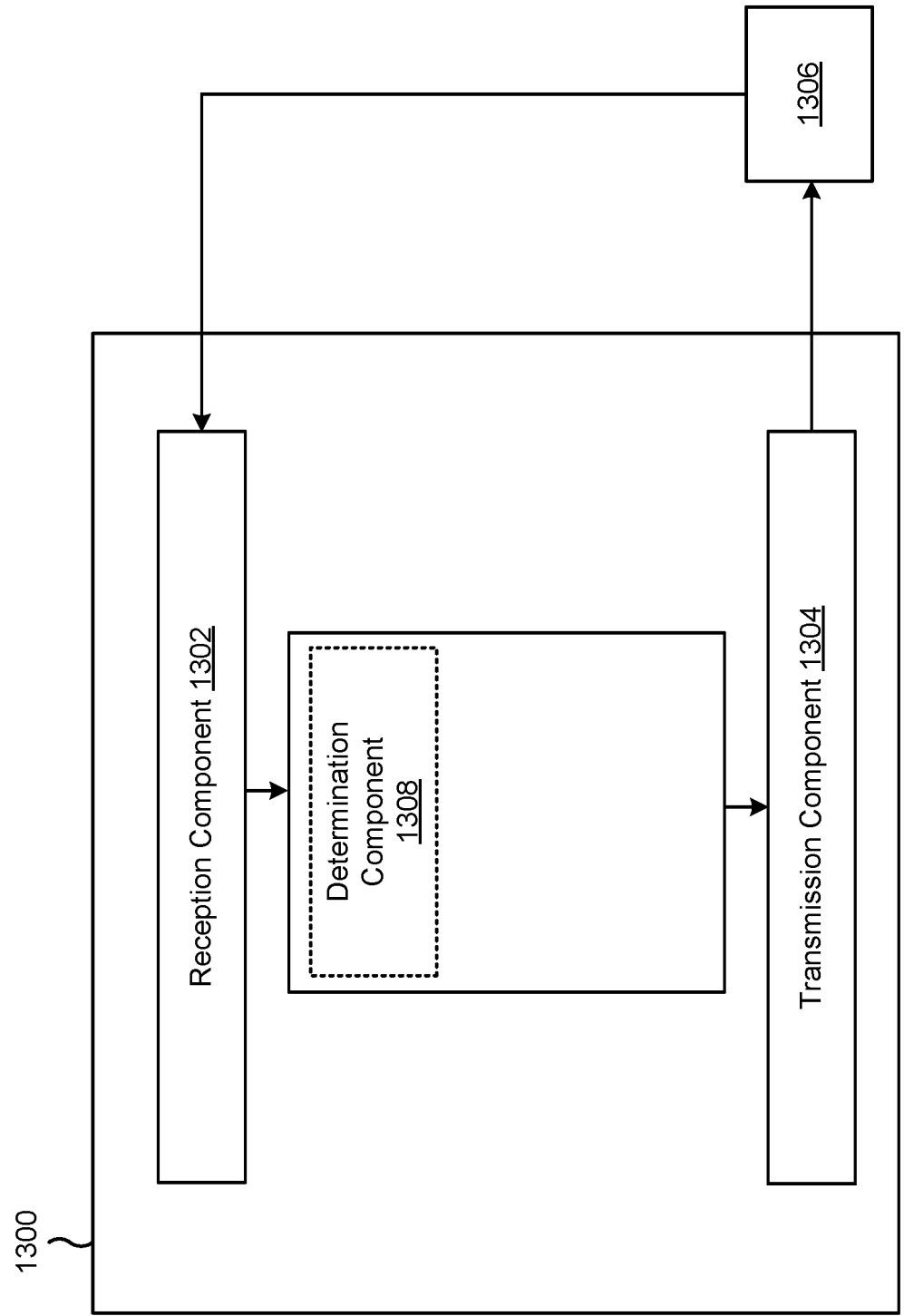

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308, among other examples.

In some aspects, the apparatus 1300 may be configured to perform one or more operations described herein in connection with FIGS. 1-8. Additionally, or alternatively, the apparatus 1300 may be configured to perform one or more processes described herein, such as process 1000 of FIG. 10. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive first capability information that indicates a capability of the mobile station to support cross-slot channel estimation based on uplink reference signals across uplink transmissions and that indicates a capability of the mobile station to switch to or from a SUL carrier. The reception component 1302 may receive second capability information that indicates a capability of the mobile station to support cross-slot channel estimation across the uplink transmissions after switching between a NUL carrier and the SUL carrier. The determination component 1308 may determine a capability of the mobile station. The transmission component 1304 may transmit a communication based at least in part on channel estimates for uplink transmissions of uplink reference signals on one or more of the NUL carrier or the SUL carrier.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
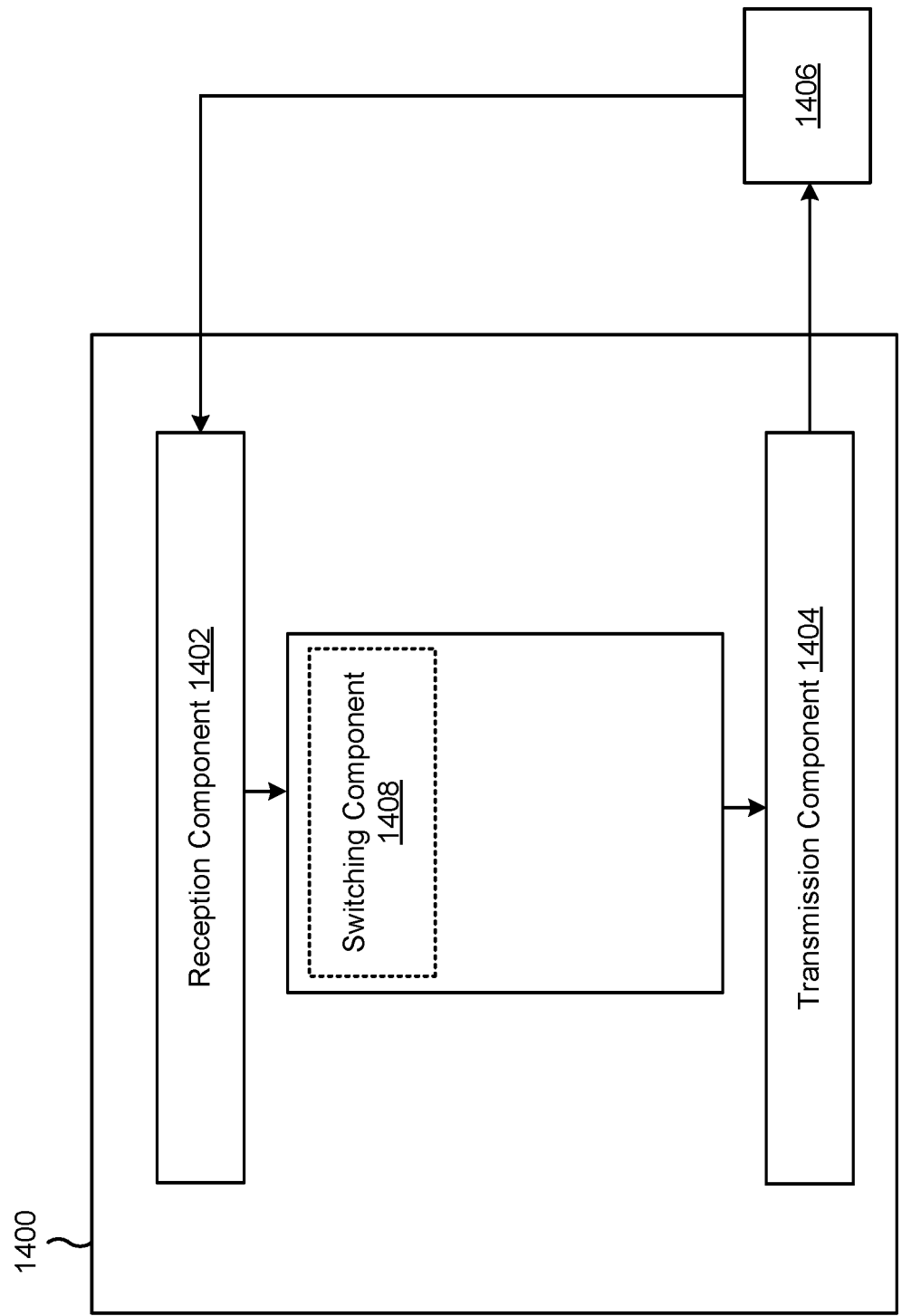

FIG. 14 is a block diagram of an example apparatus 1400 for wireless communication. The apparatus 1400 may be a mobile station, such as a UE, or a mobile station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a switching component 1408, among other examples.

In some aspects, the apparatus 1400 may be configured to perform one or more operations described herein in connection with FIGS. 1-8. Additionally, or alternatively, the apparatus 1400 may be configured to perform one or more processes described herein, such as process 1100 of FIG. 11. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 may transmit first uplink reference signals in a first time slot. The switching component 1408 may switch, in a second time slot, between a first carrier and a second carrier for uplink transmission, where the first carrier or the second carrier is a SUL carrier. The transmission component 1404 may transmit second uplink reference signals in a third time slot, wherein, based at least in part on the switching, the transmitting is independent of maintaining phase continuity between the first uplink reference signals and the second uplink reference signals.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
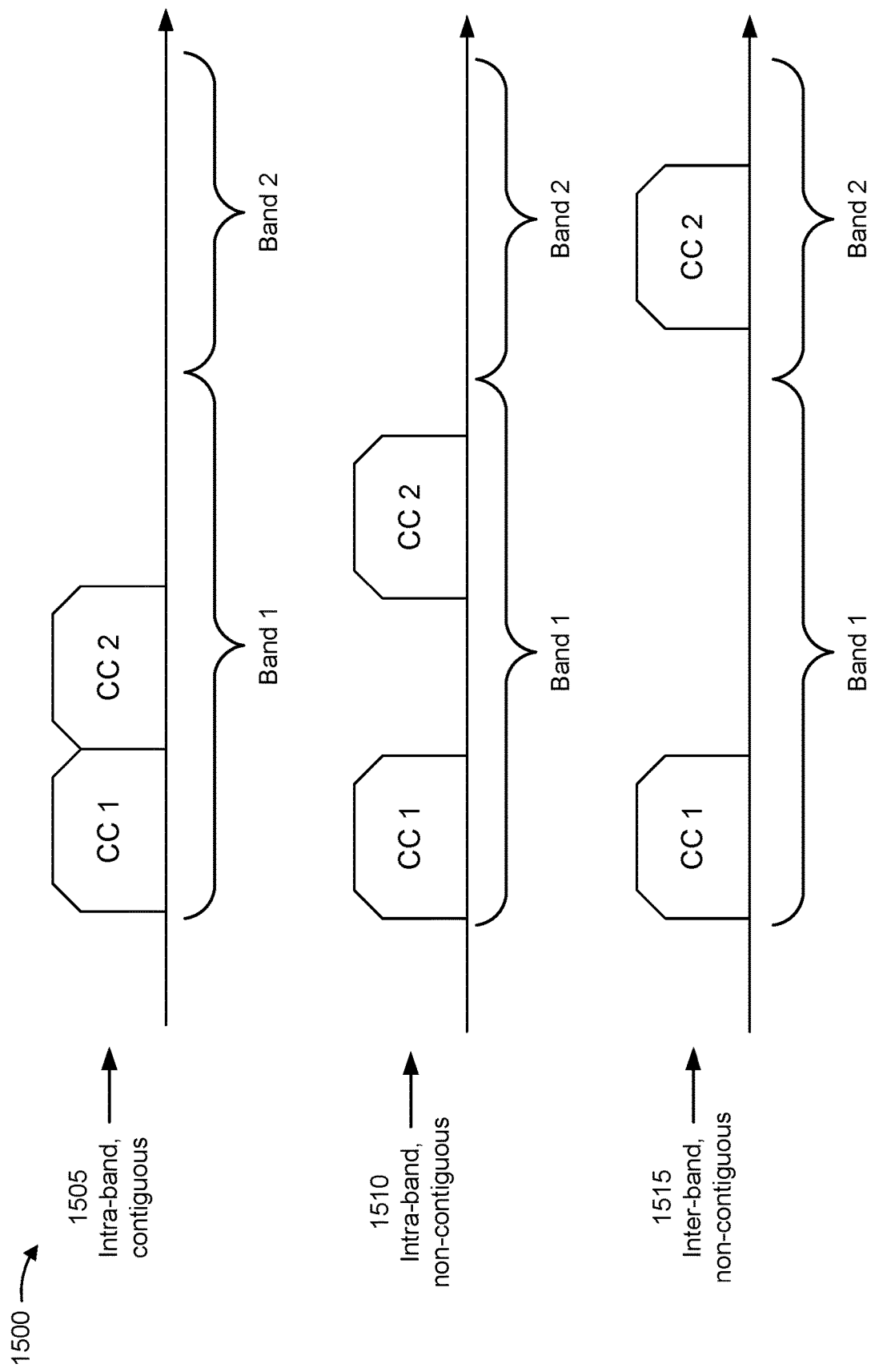
FIG. 15 is a diagram illustrating examples of carrier aggregation, in accordance with the present disclosure.

FIG. 15 is a diagram illustrating examples 1500 of carrier aggregation, in accordance with the present disclosure.

Carrier aggregation is a technology that enables two or more component carriers (CCs, sometimes referred to as carriers) to be combined (e.g., into a single channel) for a single UE to enhance data capacity. As shown, carriers can be combined in the same or different frequency bands. Additionally, or alternatively, contiguous or non-contiguous carriers can be combined. A base station may configure carrier aggregation for a UE, such as in a radio resource control (RRC) message, downlink control information (DCI), and/or another signaling message.

As shown by reference number 1505, in some aspects, intra-band carrier aggregation may be configured in an intra-band contiguous mode where the aggregated carriers are contiguous to one another and are in the same band. As shown by reference number 1510, in some aspects, carrier aggregation may be configured in an intra-band non-contiguous mode where the aggregated carriers are non-contiguous to one another and are in the same band. As shown by reference number 1515, in some aspects, carrier aggregation may be configured in an inter-band non-contiguous mode where the aggregated carriers are non-contiguous to one another and are in different bands.

In carrier aggregation, a UE may be configured with a primary carrier or primary cell (PCell) and one or more secondary carriers or secondary cells (SCells). In some aspects, the primary carrier may carry control information (e.g., DCI and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 15 is provided as an example. Other examples may differ from what is described with regard to FIG. 15.

Figure 16:
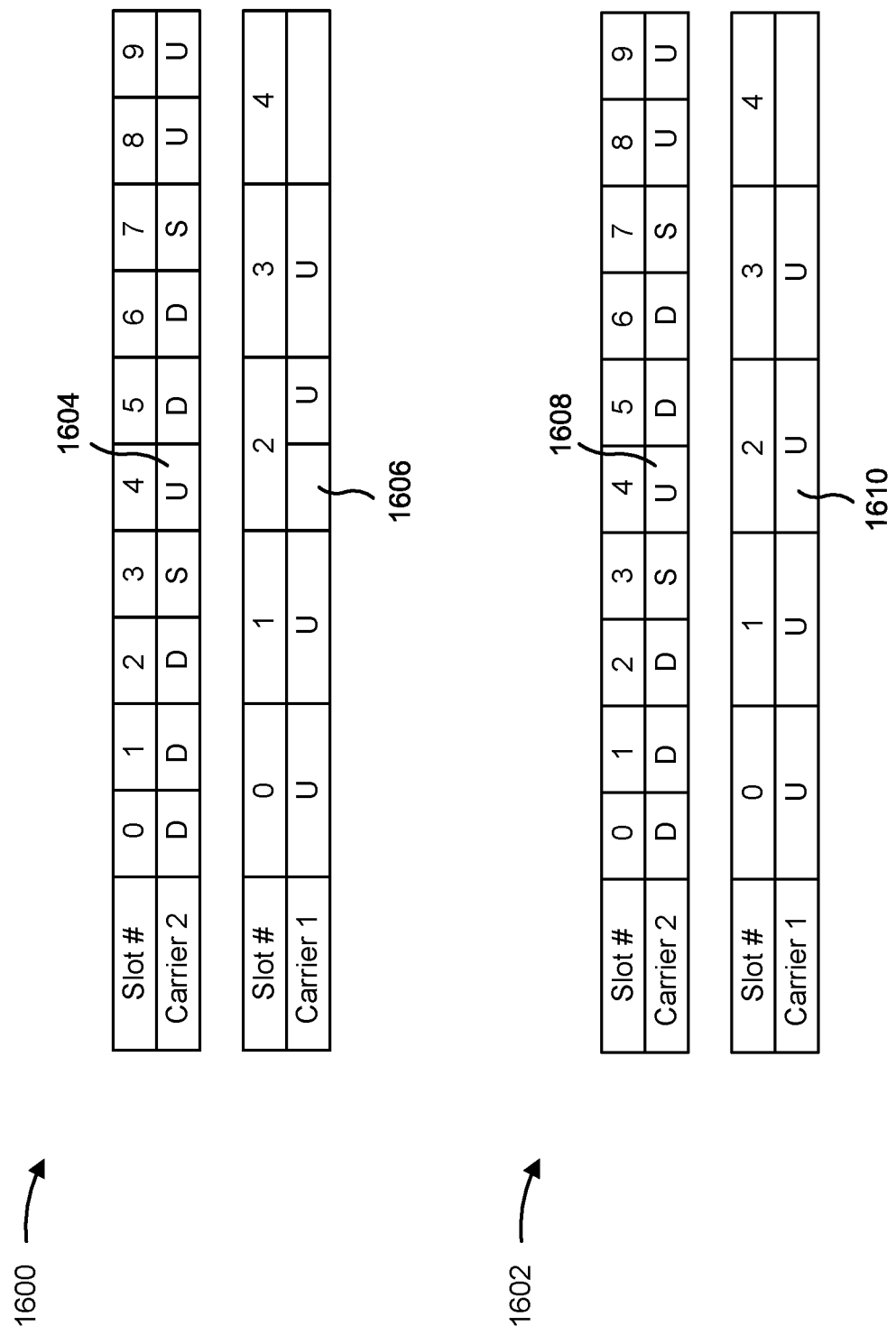
FIG. 16 is a diagram illustrating examples of uplink switching for uplink carrier aggregation, in accordance with the present disclosure.

FIG. 16 is a diagram illustrating examples 1600 and 1602 of uplink switching for uplink carrier aggregation, in accordance with the present disclosure. Examples 1600 and 1602 show slots that are scheduled for a UE on two carriers that are aggregated for inter-band carrier aggregation, for example. The slots may include slots in time division duplex (TDD) for uplink transmission (U), slots for downlink transmission (D), or special slots (S). Special slots may be used as a guard slot for switching between uplink and downlink. The UE may have two transmission chains and two, four, or six antenna ports for uplink transmission.

Uplink switching between aggregated carriers may be applicable to certain signals and/or uplink channels, such as SRSs and carriers on a PUSCH or a PUCCH. Example 1600 shows a scenario where simultaneous transmission on two carriers is not supported by the UE. For example, the UE may transmit an uplink communication on carrier 1 in slot 0 and in slot 1. The UE may switch from carrier 1 to carrier 2 to transmit an uplink communication in slot 4 of carrier 2, shown as slot 1604. The UE may use one transmission chain for transmitting an uplink communication in slot 1604 and thus uplink switching may involve tuning to a frequency band of carrier 2 and then re-tuning to a frequency band of carrier 1. As simultaneous transmission on the two carriers is not supported by the UE, the UE may not transmit any uplink communication on carrier 1 at the same time as slot 1604 of carrier 2. This empty slot on carrier 1 is shown as slot 1606.

Example 1602 shows a scenario where simultaneous transmission on two carriers is supported by the UE. For example, the UE may transmit an uplink communication on carrier 1 in slot 0 and in slot 1. The UE may switch from carrier 1 to carrier 2 to transmit an uplink communication in slot 4 of carrier 2, shown as slot 1608. As simultaneous transmission on the two carriers is supported by the UE in this scenario, the UE may transmit an uplink communication on carrier 1 at the same time as slot 1608 of carrier 2. The UE may transmit an uplink communication in slot 1610 on carrier 1.

The UE may be configured to support cross-slot channel estimation that is performed by a base station, based at least in part on uplink reference signals that the UE transmits to the base station on a carrier. In some aspects, the UE may also be configured to support cross-slot channel estimation when the UE is switching between uplink carriers that are used for carrier aggregation. However, the base station may not be aware of a capability of the UE to support cross-slot channel estimation when uplink switching is involved. As a result, the base station may not obtain accurate channel estimates if uplink switching is performed by the UE, even though the UE is able to support cross-channel estimation with uplink switching. Conversely, the base station may not obtain accurate channel estimates if the base station is expecting to use cross-slot channel estimation with uplink switching, but the UE does not support such cross-slot estimation. Such support mismatches and inaccurate channel estimation may degrade communications. Degraded communications may cause the UE and the base station to waste time, power, processing resources, and signaling resources.

As indicated above, FIG. 16 provides some examples. Other examples may differ from what is described with regard to FIG. 16.

Figure 17:
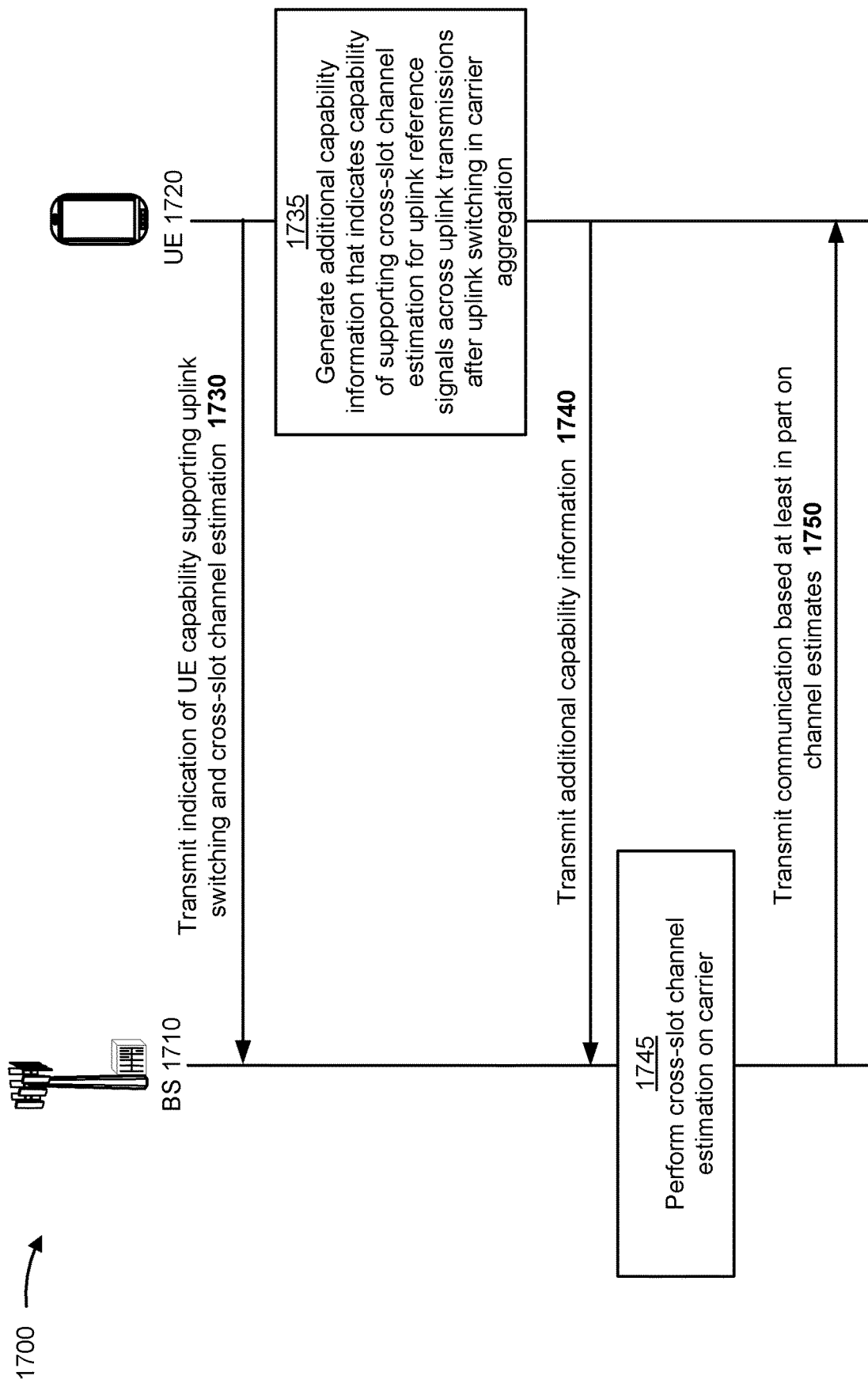
FIG. 17 is a diagram illustrating an example of signaling support for cross-slot channel estimation on uplink carriers, in accordance with the present disclosure.

FIG. 17 is a diagram illustrating an example 1700 of signaling support for cross-slot channel estimation on uplink carriers, in accordance with the present disclosure. As shown in FIG. 17, a base station (BS) 1710 (e.g., BS 110) may communicate (e.g., transmit an uplink transmission and/or receive a downlink transmission) with a mobile station, such as UE 1720 (e.g., UE 120). UE 1720 and BS 1710 may be part of a wireless network (e.g., wireless network 100).

According to various aspects described herein, a UE may indicate support for cross-slot channel estimation when uplink switching takes place between a first carrier and a second carrier that are aggregated in carrier aggregation. The carrier aggregation may include inter-band carrier aggregation or intra-band carrier aggregation. For example, the UE may indicate whether the UE supports cross-slot channel estimation based at least in part on uplink reference signals transmitted on the first carrier. The UE may indicate whether the UE supports cross-slot channel estimation based at least in part on uplink signals transmitted on the second carrier. The UE may also indicate both support for cross-slot channel estimation on the first carrier and support for cross-slot channel estimation on the second carrier.

As shown by reference number 1730, UE 1720 may transmit an indication of a UE capability for supporting uplink switching (e.g., of carriers in inter-band carrier aggregation or intra-band carrier aggregation) and for supporting cross-slot channel estimation on a carrier. As shown by reference number 1735, UE 1720 may generate additional capability information that indicates a capability of UE 1720 to support cross-slot channel estimation of uplink reference signals across uplink transmissions after uplink switching between a first carrier and a second carrier of the carrier aggregation. The uplink transmissions may be consecutive uplink transmissions or uplink transmissions in consecutive time slots. Time slots of uplink reference signals may be considered to be "consecutive time slots of uplink reference signals" if the time slots are a time slot of uplink reference signals on a carrier and a next time slot of uplink reference signals on the same carrier. There may be other intervening communications that are not uplink reference signals on the same carrier.

As shown by reference number 1740, UE 1720 may transmit the additional capability information to BS 1710. In some aspects, UE 1720 may indicate additional capability information per frequency band combination. Each carrier may operate in a frequency band, which may have different channel and traffic conditions than another frequency band. UE 1720 may transmit on carriers that are located in a combination of frequency bands, and the capability of UE 1720 may vary based at least in part on the combination of frequency bands. Accordingly, UE 1720 may indicate a capability per frequency band combination.

BS 1710 may use the additional capability information. As shown by reference number 1745, BS 1710 may perform cross-slot channel estimation on a first carrier and/or on a second carrier if supported by UE 1720 when uplink switching is involved. BS 1710 may not perform cross-slot channel estimation on a carrier if not supported by UE 1720 when uplink switching is involved. As shown by reference number 1750, BS 1710 may transmit a communication that is based at least in part on channel estimates on the first carrier and/or on channel estimates on the second carrier.

In some aspects, if UE 1720 is not scheduled to switch from a first carrier to a second carrier for uplink transmission between consecutive physical uplink transmissions (e.g., PUSCH, PUCCH) on the first carrier, UE 1720 may maintain phase continuity between the two consecutive physical uplink transmissions on the first carrier.

As indicated above, FIG. 17 is provided as an example. Other examples may differ from what is described with regard to FIG. 17.

FIG. 18 is a diagram illustrating an example 1800 of uplink transmission on two carriers, in accordance with the present disclosure.

For inter-band uplink carrier aggregation, when a UE is scheduled with uplink switching from a first carrier to a second carrier for uplink transmission on the second carrier between two consecutive PUSCH/PUCCH communications on the first carrier (slot 1804 and slot 1806 between the two consecutive slots of PUSCH/PUCCH communications in slot 3 and slot 5 of carrier 1), the UE may not maintain phase continuity between the two consecutive PUSCH/PUCCH communications on the first carrier. If the UE is not expected to maintain phase continuity between the two consecutive slots of PUSCH/PUCCH communications, the UE may conserve time and processing resources that are used to retune antennas for uplink reference signals on different frequency bands or to otherwise maintain phase coherence across uplink reference signals.

As indicated above, FIG. 18 is provided as an example. Other examples may differ from what is described with regard to FIG. 18.

Figure 19:
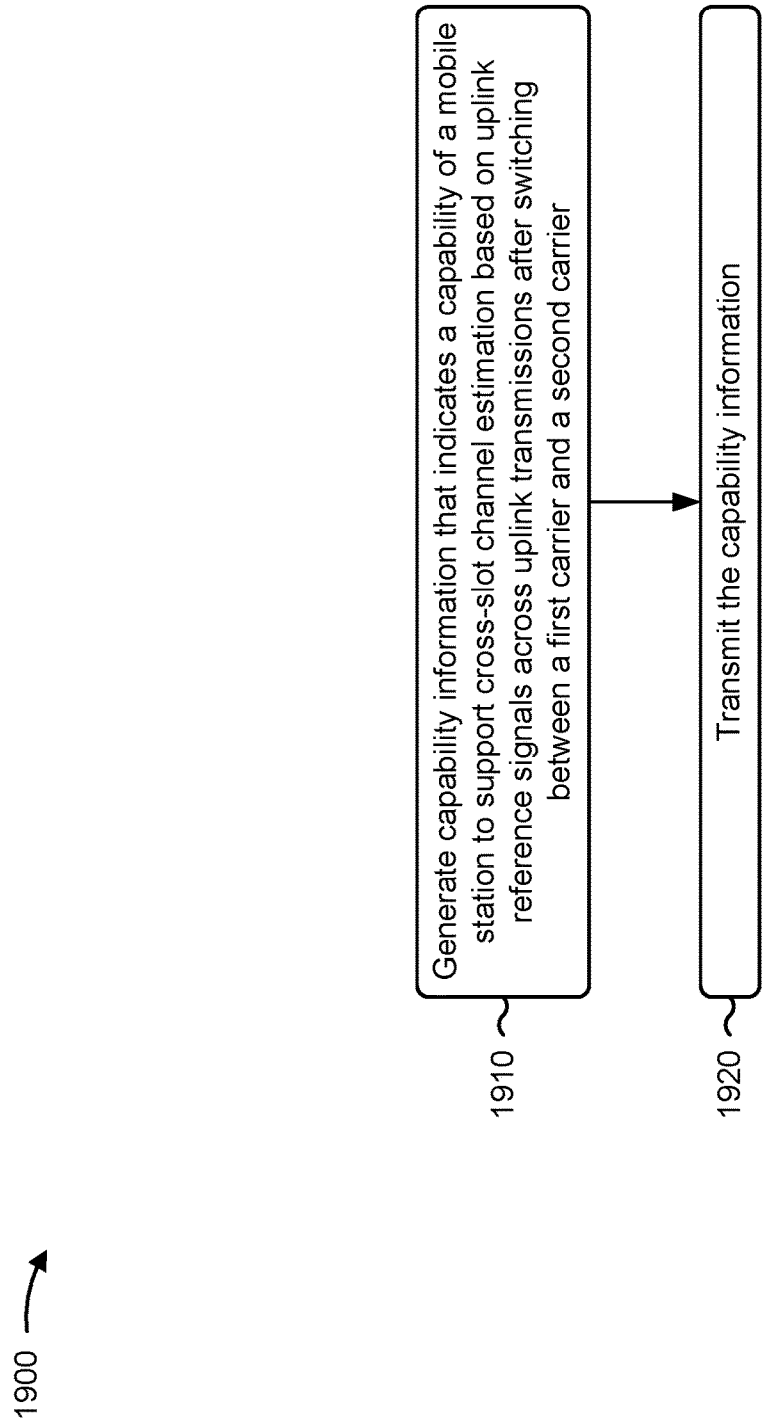
FIG. 19 is a diagram illustrating an example process performed, for example, by a mobile station, in accordance with the present disclosure.

FIG. 19 is a diagram illustrating an example process 1900 performed, for example, by a mobile station, in accordance with the present disclosure. Example process 1900 is an example where the mobile station (e.g., UE 120 depicted in FIGS. 1-2, UE 1720 depicted in FIG. 17) performs operations associated with cross-slot channel estimation of uplink reference signals with uplink switching for uplink carrier aggregation.

As shown in FIG. 19, in some aspects, process 1900 may include generating capability information that indicates a capability of the mobile station to support cross-slot channel estimation based on (or for) uplink reference signals across uplink transmissions (or consecutive time slots) after switching between a first carrier and a second carrier, based at least in part on the mobile station being capable of supporting cross-slot channel estimation across the uplink transmissions (block 1910). For example, the mobile station (e.g., using generation component 2208 depicted in FIG. 22) may generate capability information that indicates a capability of the mobile station to support cross-slot channel estimation based on (or for) uplink reference signals across uplink transmissions (or consecutive time slots) after switching between a first carrier and a second carrier, based at least in part on the mobile station being capable of supporting cross-slot channel estimation across the uplink transmissions (or the consecutive time slots), as described above. In some aspects, the uplink transmissions may be consecutive uplink transmissions or uplink transmissions in consecutive time slots. In some aspects, the uplink transmissions comprise transmissions of a PUSCH.

As further shown in FIG. 19, in some aspects, process 1900 may include transmitting the capability information (block 1920). For example, the mobile station (e.g., using transmission component 2204 depicted in FIG. 22) may transmit the capability information, as described above.

Process 1900 may include additional aspects, such as any single aspect or any combination of aspects described below and/or in connection with one or more other processes described elsewhere herein.

In a first aspect, the capability information indicates that the mobile station is capable of supporting cross-slot channel estimation across uplink transmissions on the first carrier and not the second carrier.

In a second aspect, alone or in combination with the first aspect, the capability information indicates that the mobile station is capable of supporting cross-slot channel estimation across uplink transmissions on the second carrier and not the first carrier.

In a third aspect, alone or in combination with one or more of the first and second aspects, the capability information indicates that the mobile station is capable of supporting cross-slot channel estimation across uplink transmissions on the first carrier and supporting cross-slot channel estimation across uplink transmissions on the second carrier.

In a fourth aspect, alone or in combination with one or more of the first through third aspects, the uplink reference signals comprise DMRSs of a PUSCH.

In a fifth aspect, alone or in combination with one or more of the first through fourth aspects, the uplink reference signals comprise DMRSs of a PUCCH.

In a sixth aspect, alone or in combination with one or more of the first through fifth aspects, the uplink reference signals comprise SRSs.

In a seventh aspect, alone or in combination with one or more of the first through sixth aspects, the capability information indicates the capability of the mobile station to support cross-slot channel estimation per combination of frequency bands.

In an eighth aspect, alone or in combination with one or more of the first through seventh aspects, supporting cross-slot channel estimation comprises maintaining phase continuity of the uplink reference signals of the uplink transmissions.

In a ninth aspect, alone or in combination with one or more of the first through eighth aspects, the first carrier is a NUL carrier, the second carrier is a SUL carrier, and generating the capability information includes generating the capability information further based at least in part on being capable of switching to or from the SUL carrier.

In a tenth aspect, alone or in combination with one or more of the first through ninth aspects, the first carrier and the second carrier are combined for uplink carrier aggregation, and generating the capability information includes generating the capability information further based at least in part on being capable of uplink carrier switching between the uplink transmissions.

In an eleventh aspect, alone or in combination with one or more of the first through tenth aspects, the uplink carrier aggregation includes uplink inter-band carrier aggregation.

In a twelfth aspect, alone or in combination with one or more of the first through eleventh aspects, the uplink carrier aggregation includes uplink intra-band carrier aggregation.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
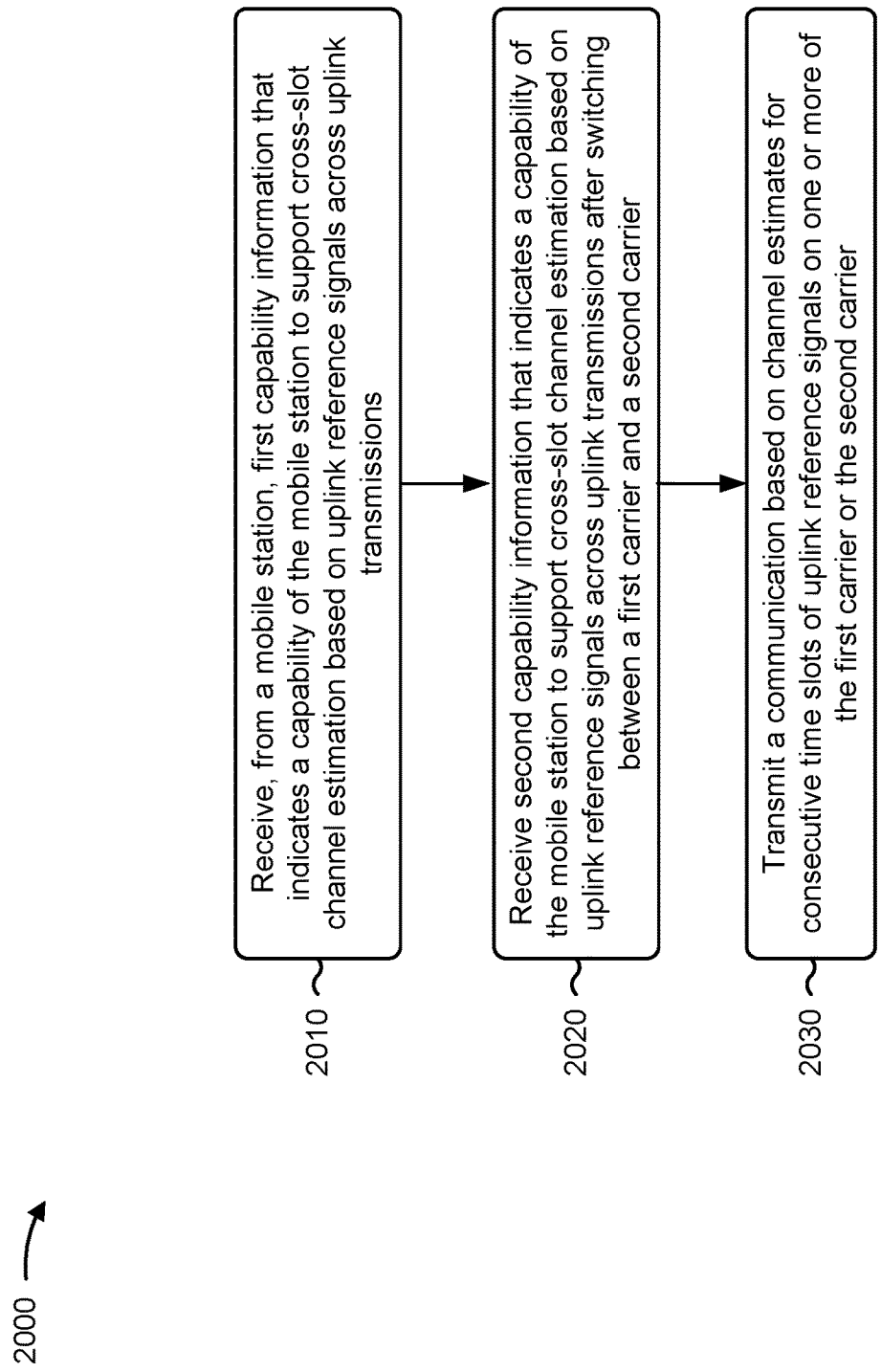
FIG. 20 is a diagram illustrating an example process performed, for example, by a base station, in accordance with the present disclosure.

FIG. 20 is a diagram illustrating an example process 2000 performed, for example, by a base station, in accordance with the present disclosure. Example process 2000 is an example where the base station (e.g., base station 110 depicted in FIGS. 1-2, BS 1710 depicted in FIG. 17) performs operations associated with cross-slot channel estimation of uplink reference signals with uplink switching for uplink carrier aggregation.

As shown in FIG. 20, in some aspects, process 2000 may include receiving first capability information that indicates a capability of the mobile station to support cross-slot channel estimation based on (or for) uplink reference signals across uplink transmissions (or consecutive time slots) (block 2010). For example, the base station (e.g., using reception component 2302 depicted in FIG. 23) may receive first capability information that indicates a capability of the mobile station to support cross-slot channel estimation based on (or for) uplink reference signals across uplink transmissions (or consecutive time slots), as described above. In some aspects, an uplink transmission comprises a transmission of a PUSCH. In some aspects, the uplink transmissions may be consecutive uplink transmissions or uplink transmissions in consecutive time slots. In some aspects, the capability information indicates a capability of the mobile station to support uplink carrier switching between the consecutive time slots. In some aspects, the capability information indicates a capability of the mobile station to switch to or from a SUL carrier.

As further shown in FIG. 20, in some aspects, process 2000 may include receiving second capability information that indicates a capability of the mobile station to support cross-slot channel estimation based on (or for) uplink reference signals across uplink transmissions (or consecutive time slots) after switching between a first carrier and a second carrier (block 2020). For example, the base station (e.g., using reception component 2302 depicted in FIG. 23) may receive second capability information that indicates a capability of the mobile station to support cross-slot channel estimation based on (or for) uplink reference signals across uplink transmissions (or consecutive time slots) after switching between a first carrier and a second carrier, as described above.

As further shown in FIG. 20, in some aspects, process 2000 may include transmitting a communication based on channel estimates for uplink transmissions of uplink reference signals on one or more of the first carrier or the second carrier (block 2030). For example, the base station (e.g., using transmission component 2304 depicted in FIG. 23) may transmit a communication based on channel estimates for uplink transmissions of uplink reference signals on one or more of the first carrier or the second carrier, as described above.

Process 2000 may include additional aspects, such as any single aspect or any combination of aspects described below and/or in connection with one or more other processes described elsewhere herein.

In a first aspect, the capability information indicates that the mobile station is capable of supporting cross-slot channel estimation across uplink transmissions on the first carrier and not the second carrier.

In a second aspect, alone or in combination with the first aspect, the capability information indicates that the mobile station is capable of supporting cross-slot channel estimation across uplink transmissions on the second carrier and not the first carrier.

In a third aspect, alone or in combination with one or more of the first and second aspects, the capability information indicates that the mobile station is capable of supporting cross-slot channel estimation across uplink transmissions on the first carrier and supporting cross-slot channel estimation across uplink transmissions on the second carrier.

In a fourth aspect, alone or in combination with one or more of the first through third aspects, the uplink reference signals comprise DMRSs of a PUSCH.

In a fifth aspect, alone or in combination with one or more of the first through fourth aspects, the uplink reference signals comprise DMRSs of a PUCCH.

In a sixth aspect, alone or in combination with one or more of the first through fifth aspects, the uplink reference signals comprise SRSs.

In a seventh aspect, alone or in combination with one or more of the first through sixth aspects, the capability information indicates the capability of the mobile station to support cross-slot channel estimation per combination of frequency bands.

In an eighth aspect, alone or in combination with one or more of the first through seventh aspects, supporting cross-slot channel estimation comprises maintaining phase continuity of the uplink reference signals of the uplink transmissions.

In a ninth aspect, alone or in combination with one or more of the first through eighth aspects, the first carrier is a NUL carrier, and the second carrier is a SUL carrier.

In a tenth aspect, alone or in combination with one or more of the first through ninth aspects, the first carrier and the second carrier are combined for uplink carrier aggregation.

In an eleventh aspect, alone or in combination with one or more of the first through tenth aspects, the uplink carrier aggregation includes uplink inter-band carrier aggregation.

In a twelfth aspect, alone or in combination with one or more of the first through eleventh aspects, the uplink carrier aggregation includes uplink intra-band carrier aggregation.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
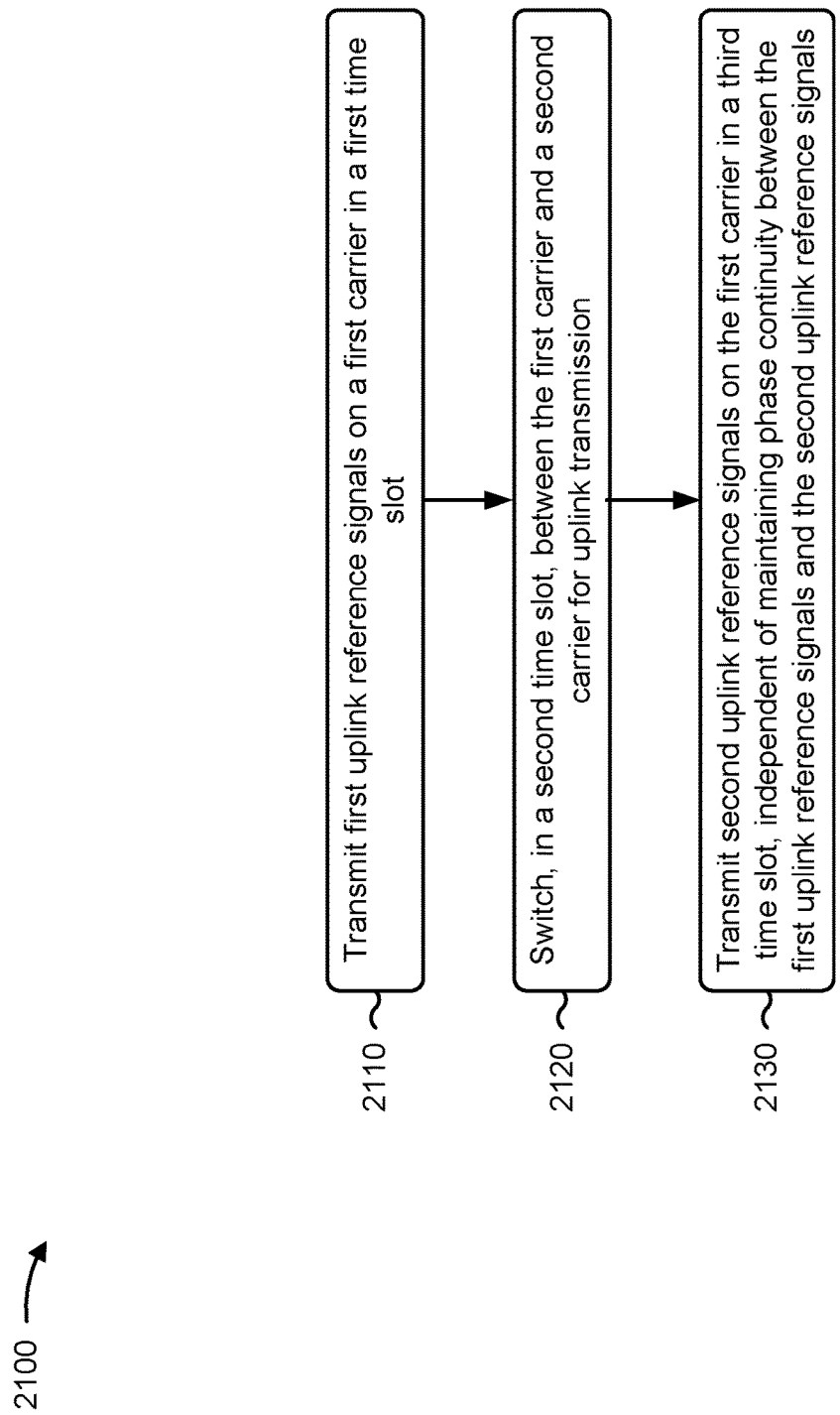
FIG. 21 is a diagram illustrating an example process performed, for example, by a mobile station, in accordance with the present disclosure.

FIG. 21 is a diagram illustrating an example process 2100 performed, for example, by a mobile station, in accordance with the present disclosure. Example process 2100 is an example where the mobile station (e.g., UE 120 depicted in FIGS. 1-2, UE 820 depicted in FIG. 8, UE 1720 depicted in FIG. 17) performs operations associated with cross-slot channel estimation of uplink reference signals with uplink switching for uplink carrier aggregation.

As shown in FIG. 21, in some aspects, process 2100 may include transmitting first uplink reference signals on a first carrier in a first time slot (block 2110). For example, the mobile station (e.g., using transmission component 2404 depicted in FIG. 24) may transmit first uplink reference signals on a first carrier in a first time slot, as described above.

As further shown in FIG. 21, in some aspects, process 2100 may include switching between the first carrier and a second carrier for uplink transmission in a second time slot (block 2120). For example, the mobile station (e.g., using switching component 2408 depicted in FIG. 24) may switch between the first carrier and a second carrier for uplink transmission in a second time slot, as described above. In some aspects, the first carrier and the second carrier are combined for carrier aggregation (e.g., inter-band, intra-band).

As further shown in FIG. 21, in some aspects, process 2100 may include transmitting second uplink reference signals on the first carrier in a third time slot (block 2130). For example, the mobile station (e.g., using transmission component 2404 depicted in FIG. 24) may transmit second uplink reference signals on the first carrier in a third time slot, as described above. In some aspects, based at least in part on the switching, the transmitting is independent of maintaining phase continuity between the first uplink reference signals and the second uplink reference signals.

Process 2100 may include additional aspects, such as any single aspect or any combination of aspects described below and/or in connection with one or more other processes described elsewhere herein.

In a first aspect, the first uplink reference signals and the second uplink reference signals comprise DMRSs of a PUSCH.

In a second aspect, alone or in combination with the first aspect, the first uplink reference signals and the second uplink reference signals comprise DMRSs of a PUCCH.

In a third aspect, alone or in combination with one or more of the first and second aspects, the first uplink reference signals and the second uplink reference signals comprise SRSs.

In a fourth aspect, alone or in combination with one or more of the first through third aspects, the first uplink reference signals and the second uplink reference signals are transmitted on the first carrier, and the switching comprises switching from the first carrier to the second carrier.

In a fifth aspect, alone or in combination with one or more of the first through fourth aspects, during the second time slot, an uplink transmission on the first carrier overlaps in time with an uplink transmission on the second carrier.

In aسixth aspect, alone or in combination with one or more of the first through fifth aspects, simultaneous transmission on the first carrier and the second carrier is not supported by the mobile station.

In a seventh aspect, alone or in combination with one or more of the first through sixth aspects, simultaneous transmission on the first carrier and the second carrier is supported by the mobile station.

In an eighth aspect, alone or in combination with one or more of the first through seventh aspects, the first carrier is a NUL carrier, and the second carrier is a SUL carrier.

In a ninth aspect, alone or in combination with one or more of the first through eighth aspects, the first carrier and the second carrier are combined for uplink carrier aggregation.

In a tenth aspect, alone or in combination with one or more of the first through ninth aspects, the uplink carrier aggregation includes uplink inter-band carrier aggregation.

In an eleventh aspect, alone or in combination with one or more of the first through tenth aspects, the uplink carrier aggregation includes uplink intra-band uplink carrier aggregation.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
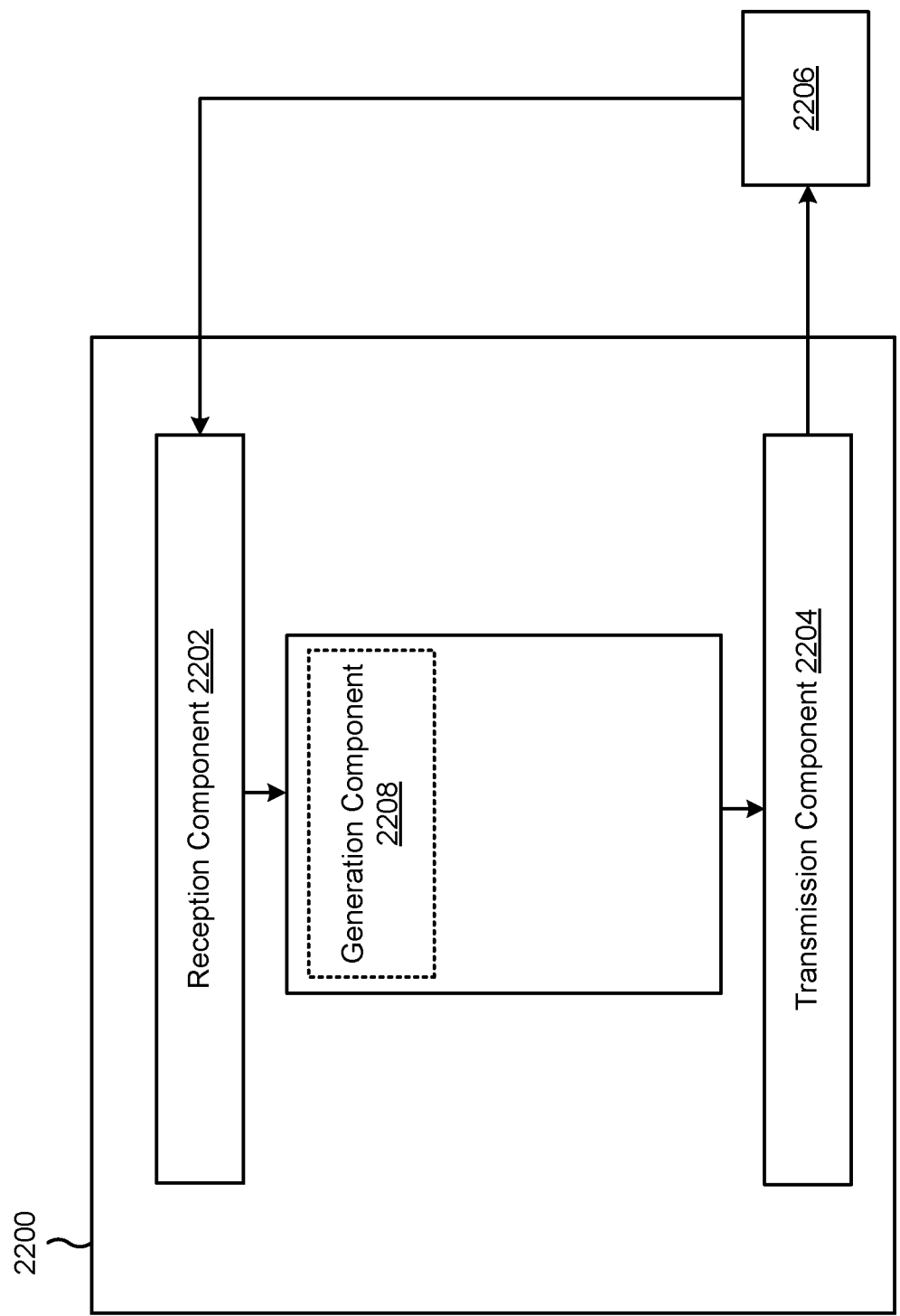
FIGS. 22-24 are block diagrams of example apparatuses for wireless communication, in accordance with the present disclosure.

FIG. 22 is a block diagram of an example apparatus 2200 for wireless communication. The apparatus 2200 may be a mobile station, such as a UE, or a mobile station may include the apparatus 2200. In some aspects, the apparatus 2200 includes a reception component 2202 and a transmission component 2204, which may be in communication with one another (for example, via one or more buses and/or one or more other components). As shown, the apparatus 2200 may communicate with another apparatus 2206 (such as a UE, a base station, or another wireless communication device) using the reception component 2202 and the transmission component 2204. As further shown, the apparatus 2200 may include a generation component 2208, among other examples.

In some aspects, the apparatus 2200 may be configured to perform one or more operations described herein in connection with FIGS. 1-5 and 15-18. Additionally, or alternatively, the apparatus 2200 may be configured to perform one or more processes described herein, such as process 1900 of FIG. 19. In some aspects, the apparatus 2200 and/or one or more components shown in FIG. 22 may include one or more components of the UE described above in connection with FIG. 2. Additionally, or alternatively, one or more components shown in FIG. 22 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2206. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a demodulator, a MIMO detector, a receive processor, a controller/processor, a memory, or a combination thereof, of the UE described above in connection with FIG. 2.

The transmission component 2204 may transmit communications, such as reference signals, control information, data communications, or a combination thereof, to the apparatus 2206. In some aspects, one or more other components of the apparatus 2200 may generate communications and may provide the generated communications to the transmission component 2204 for transmission to the apparatus 2206. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2206. In some aspects, the transmission component 2204 may include one or more antennas, a modulator, a transmit MIMO processor, a transmit processor, a controller/processor, a memory, or a combination thereof, of the UE described above in connection with FIG. 2. In some aspects, the transmission component 2204 may be co-located with the reception component 2202 in a transceiver.

The generation component 2208 may generate capability information that indicates a capability of the mobile station to support cross-slot channel estimation based on uplink reference signals across uplink transmissions after switching between a first carrier and a second carrier that are combined for uplink carrier aggregation, based at least in part on the mobile station being capable of supporting cross-slot channel estimation across the uplink transmissions and being capable of uplink carrier switching between the uplink transmissions. The transmission component 2204 may transmit the capability information.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

Figure 23:
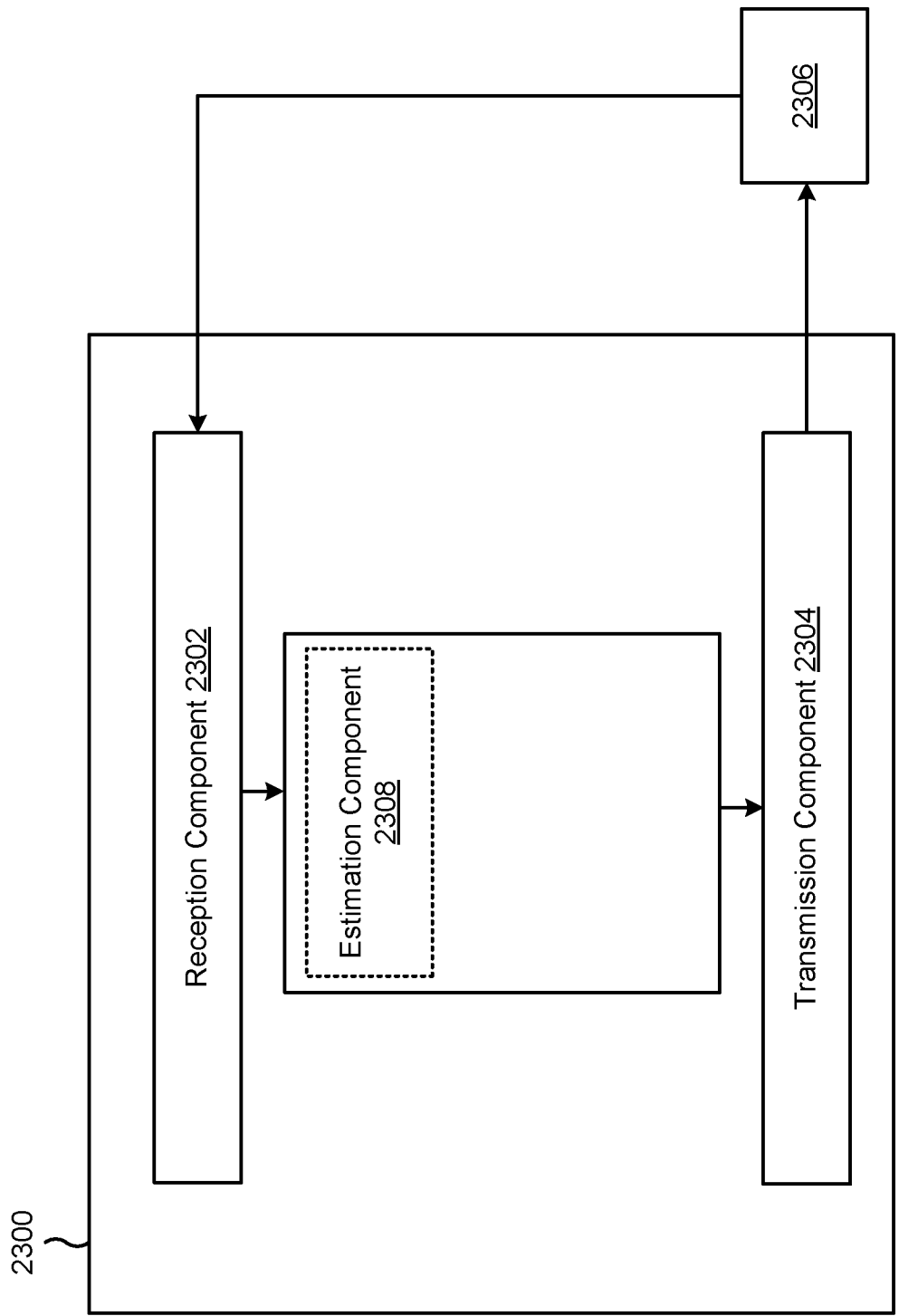

FIG. 23 is a block diagram of an example apparatus 2300 for wireless communication. The apparatus 2300 may be a base station, or a base station may include the apparatus 2300. In some aspects, the apparatus 2300 includes a reception component 2302 and a transmission component 2304, which may be in communication with one another (for example, via one or more buses and/or one or more other components). As shown, the apparatus 2300 may communicate with another apparatus 2306 (such as a UE, a base station, or another wireless communication device) using the reception component 2302 and the transmission component 2304. As further shown, the apparatus 2300 may include an estimation component 2308, among other examples.

In some aspects, the apparatus 2300 may be configured to perform one or more operations described herein in connection with FIGS. 1-5 and 15-18. Additionally, or alternatively, the apparatus 2300 may be configured to perform one or more processes described herein, such as process 2000 of FIG. 20. In some aspects, the apparatus 2300 and/or one or more components shown in FIG. 23 may include one or more components of the base station described above in connection with FIG. 2. Additionally, or alternatively, one or more components shown in FIG. 23 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2302 may receive communications, such as reference signals, control information, data communications, or a combination thereof, from the apparatus 2306. The reception component 2302 may provide received communications to one or more other components of the apparatus 2300. In some aspects, the reception component 2302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2300. In some aspects, the reception component 2302 may include one or more antennas, a demodulator, a MIMO detector, a receive processor, a controller/processor, a memory, or a combination thereof, of the base station described above in connection with FIG. 2.

The transmission component 2304 may transmit communications, such as reference signals, control information, data communications, or a combination thereof, to the apparatus 2306. In some aspects, one or more other components of the apparatus 2300 may generate communications and may provide the generated communications to the transmission component 2304 for transmission to the apparatus 2306. In some aspects, the transmission component 2304 may perform signal processing on the generated communications (such as filtering, amplification, modulation, digital-to-analog conversion, multiplexing, interleaving, mapping, or encoding, among other examples), and may transmit the processed signals to the apparatus 2306. In some aspects, the transmission component 2304 may include one or more antennas, a modulator, a transmit MIMO processor, a transmit processor, a controller/processor, a memory, or a combination thereof, of the base station described above in connection with FIG. 2. In some aspects, the transmission component 2304 may be co-located with the reception component 2302 in a transceiver.

The reception component 2302 may receive first capability information that indicates a capability of the mobile station to support cross-slot channel estimation based on uplink reference signals across uplink transmissions and to support uplink carrier switching between the uplink transmissions. The reception component 2302 may receive second capability information that indicates a capability of the mobile station to support cross-slot channel estimation based on uplink reference signals across uplink transmissions after switching between a first carrier and a second carrier that are combined for uplink carrier aggregation. The estimation component 2308 may perform cross-slot channel estimation on the uplink reference signals across the uplink transmissions. The transmission component 2304 may transmit a communication based on channel estimates for uplink transmissions of uplink reference signals on one or more of the first carrier or the second carrier.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of (one or more) components shown in FIG. 23 may perform one or more functions described as being performed by another set of components shown in FIG. 23.

Figure 24:
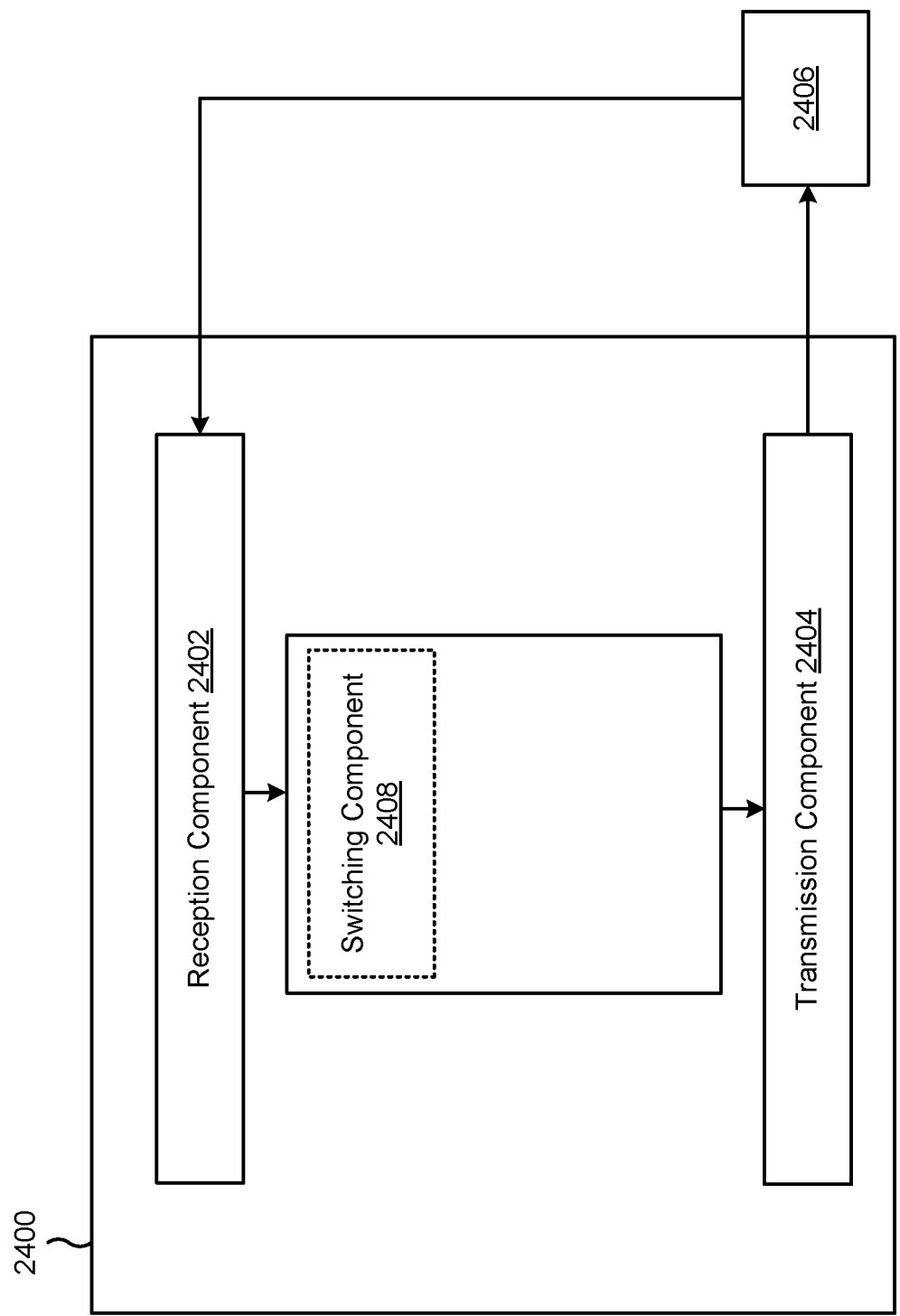

FIG. 24 is a block diagram of an example apparatus 2400 for wireless communication. The apparatus 2400 may be a mobile station, such as a UE, or a mobile station may include the apparatus 2400. In some aspects, the apparatus 2400 includes a reception component 2402 and a transmission component 2404, which may be in communication with one another (for example, via one or more buses and/or one or more other components). As shown, the apparatus 2400 may communicate with another apparatus 2406 (such as a UE, a base station, or another wireless communication device) using the reception component 2402 and the transmission component 2404. As further shown, the apparatus 2400 may include a switching component 2408, among other examples.

In some aspects, the apparatus 2400 may be configured to perform one or more operations described herein in connection with FIGS. 1-5 and 15-18. Additionally, or alternatively, the apparatus 2400 may be configured to perform one or more processes described herein, such as process 2100 of FIG. 21. In some aspects, the apparatus 2400 and/or one or more components shown in FIG. 24 may include one or more components of the UE described above in connection with FIG. 2. Additionally, or alternatively, one or more components shown in FIG. 24 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2402 may receive communications, such as reference signals, control information, data communications, or a combination thereof, from the apparatus 2406. The reception component 2402 may provide received communications to one or more other components of the apparatus 2400. In some aspects, the reception component 2402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2400. In some aspects, the reception component 2402 may include one or more antennas, a demodulator, a MIMO detector, a receive processor, a controller/processor, a memory, or a combination thereof, of the UE described above in connection with FIG. 2.

The transmission component 2404 may transmit communications, such as reference signals, control information, data communications, or a combination thereof, to the apparatus 2406. In some aspects, one or more other components of the apparatus 2400 may generate communications and may provide the generated communications to the transmission component 2404 for transmission to the apparatus 2406. In some aspects, the transmission component 2404 may perform signal processing on the generated communications (such as filtering, amplification, modulation, digital-to-analog conversion, multiplexing, interleaving, mapping, or encoding, among other examples), and may transmit the processed signals to the apparatus 2406. In some aspects, the transmission component 2404 may include one or more antennas, a modulator, a transmit MIMO processor, a transmit processor, a controller/processor, a memory, or a combination thereof, of the UE described above in connection with FIG. 2. In some aspects, the transmission component 2404 may be co-located with the reception component 2402 in a transceiver.

The transmission component 2404 may transmit first uplink reference signals on a first carrier in a first time slot. The switching component 2408 may switch between the first carrier and a second carrier for uplink transmission in a second time slot, where the first carrier and the second carrier are combined for carrier aggregation. The transmission component 2404 may transmit second uplink reference signals on the first carrier in a third time slot, where, based at least in part on the switching, the transmitting is independent of maintaining phase continuity between the first uplink reference signals and the second uplink reference signals.

The number and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single component shown in FIG. 24 may be implemented as multiple, distributed components. Additionally, or alternatively, a set of (one or more) components shown in FIG. 24 may perform one or more functions described as being performed by another set of components shown in FIG. 24.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some aspects of the present disclosure:

Aspect 1: A method of wireless communication performed by a mobile station, comprising: generating, by the mobile station, capability information that indicates a capability of the mobile station to support cross-slot channel estimation based on uplink reference signals across uplink transmissions after switching between a normal uplink (NUL) carrier and a supplementary uplink (SUL) carrier, based at least in part on the mobile station being capable of supporting cross-slot channel estimation across the uplink transmissions and being capable of switching to or from the SUL carrier; and transmitting, by the mobile station, the capability information.

Aspect 2: The method of Aspect 1, wherein the capability information indicates that the mobile station is capable of supporting cross-slot channel estimation across uplink transmissions on the NUL carrier and not the SUL carrier.

Aspect 3: The method of Aspect 1, wherein the capability information indicates that the mobile station is capable of supporting cross-slot channel estimation across uplink transmissions on the SUL carrier and not the NUL carrier.

Aspect 4: The method of Aspect 1, wherein the capability information indicates that the mobile station is capable of supporting cross-slot channel estimation across uplink transmissions on the SUL carrier and supporting cross-slot channel estimation across uplink transmissions on the NUL carrier.

Aspect 5: The method of any of Aspects 1-4, wherein the uplink reference signals comprise demodulation reference signals of a physical uplink shared channel.

Aspect 6: The method of any of Aspects 1-4, wherein the uplink reference signals comprise demodulation reference signals of a physical uplink control channel.

Aspect 7: The method of any of Aspects 1-4, wherein the uplink reference signals comprise sounding reference signals.

Aspect 8: The method of any of Aspects 1-7, wherein the capability information indicates the capability of the mobile station to support cross-slot channel estimation per combination of frequency bands.

Aspect 9: The method of any of Aspects 1-8, wherein supporting cross-slot channel estimation comprises maintaining phase continuity of the uplink reference signals of the uplink transmissions.

Aspect 10: A method of wireless communication performed by a base station, comprising: receiving, by the base station from a mobile station, first capability information that indicates a capability of the mobile station to support cross-slot channel estimation based on uplink reference signals across uplink transmissions and that indicates a capability of the mobile station to switch to or from a supplementary uplink (SUL) carrier; receiving, by the base station from the mobile station, second capability information that indicates a capability of the mobile station to support cross-slot channel estimation across the uplink transmissions after switching between a normal uplink (NUL) carrier and the SUL carrier; and transmitting, by the base station to the mobile station, a communication based at least in part on channel estimates for uplink transmissions of uplink reference signals on one or more of the NUL carrier or the SUL carrier.

Aspect 11: The method of Aspect 10, wherein the capability information indicates that the mobile station is capable of supporting cross-slot channel estimation across uplink transmissions on the NUL carrier and not the SUL carrier.

Aspect 12: The method of Aspect 10, wherein the capability information indicates that the mobile station is capable of supporting cross-slot channel estimation across uplink transmissions on the SUL carrier and not the NUL carrier.

Aspect 13: The method of Aspect 10, wherein the capability information indicates that the mobile station is capable of supporting cross-slot channel estimation across uplink transmissions on the SUL carrier and supporting cross-slot channel estimation across uplink transmissions on the NUL carrier.

Aspect 14: The method of any of Aspects 10-13, wherein the uplink reference signals comprise demodulation reference signals of a physical uplink shared channel.

Aspect 15: The method of any of Aspects 10-13, wherein the uplink reference signals comprise demodulation reference signals of a physical uplink control channel.

Aspect 16: The method of any of Aspects 10-13, wherein the uplink reference signals comprise sounding reference signals.

Aspect 17: The method of any of Aspects 10-16, wherein the capability information indicates the capability of the mobile station to support cross-slot channel estimation per combination of frequency bands.

Aspect 18: The method of any of Aspects 10-17, wherein supporting cross-slot channel estimation comprises maintaining phase continuity of the uplink reference signals of the uplink transmissions.

Aspect 19: A method of wireless communication performed by a mobile station, comprising: transmitting, by the mobile station, first uplink reference signals in a first time slot; switching, by the mobile station in a second time slot, between a first carrier and a second carrier for uplink transmission, wherein the first carrier or the second carrier is a supplementary uplink (SUL) carrier; and transmitting, by the mobile station, second uplink reference signals in a third time slot, wherein, based at least in part on the switching, the transmitting is independent of maintaining phase continuity between the first uplink reference signals and the second uplink reference signals.

Aspect 20: The method of Aspect 19, wherein the first uplink reference signals and the second uplink reference signals comprise demodulation reference signals of a physical uplink shared channel.

Aspect 21: The method of Aspect 19 or 20, wherein the first uplink reference signals and the second uplink reference signals comprise demodulation reference signals of a physical uplink control channel.

Aspect 22: The method of any of Aspects 19-21, wherein the first uplink reference signals and the second uplink reference signals comprise sounding reference signals.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the memory and the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The following provides an overview of some aspects of the present disclosure:

Aspect 1: A method of wireless communication performed by a mobile station, comprising: generating, by the mobile station, capability information that indicates a capability of the mobile station to support cross-slot channel estimation based on uplink reference signals across uplink transmissions after switching between a first carrier and a second carrier, based at least in part on the mobile station being capable of supporting cross-slot channel estimation across the uplink transmissions; and transmitting, by the mobile station, the capability information.

Aspect 2: The method of Aspect 1, wherein the capability information indicates that the mobile station is capable of supporting cross-slot channel estimation across uplink transmissions on the first carrier and not the second carrier.

Aspect 3: The method of Aspect 1, wherein the capability information indicates that the mobile station is capable of supporting cross-slot channel estimation across uplink transmissions on the second carrier and not the first carrier.

Aspect 4: The method of Aspect 1, wherein the capability information indicates that the mobile station is capable of supporting cross-slot channel estimation across uplink transmissions on the first carrier and supporting cross-slot channel estimation across uplink transmissions on the second carrier.

Aspects 5: The method of any of Aspects 1-4, wherein the uplink transmissions comprise transmissions of a physical uplink shared channel.

Aspect 6: The method of any of Aspects 1-5, wherein the uplink reference signals comprise demodulation reference signals of a physical uplink shared channel.

Aspect 7: The method of any of Aspects 1-5, wherein the uplink reference signals comprise demodulation reference signals of a physical uplink control channel.

Aspect 8: The method of any of Aspects 1-5, wherein the uplink reference signals comprise sounding reference signals.

Aspect 9: The method of any of Aspects 1-8, wherein the capability information indicates the capability of the mobile station to support cross-slot channel estimation per combination of frequency bands.

Aspect 10: The method of any of Aspects 1-9, wherein supporting cross-slot channel estimation comprises maintaining phase continuity of the uplink reference signals of the uplink transmissions.

Aspect 11: The method of any of Aspects 1-10, wherein the first carrier is a normal uplink (NUL) carrier, and the second carrier is a supplemental uplink (SUL) carrier, and wherein the one or more processors, to generate the capability information, are configured to generate the capability information further based at least in part on being capable of switching to or from the SUL carrier.

Aspect 12: The method of any of Aspects 1-10, wherein the first carrier and the second carrier are combined for uplink carrier aggregation, and wherein the one or more processors, to generate the capability information, are configured to generate the capability information further based at least in part on being capable of uplink carrier switching between the uplink transmissions.

Aspect 13: The method of Aspect 12, wherein the uplink carrier aggregation includes uplink inter-band carrier aggregation.

Aspect 14: The method of Aspect 12, wherein the uplink carrier aggregation includes uplink intra-band carrier aggregation.

Aspect 15: A method of wireless communication performed by a base station, comprising: receiving, by the base station from a mobile station, first capability information that indicates a capability of the mobile station to support cross-slot channel estimation based on uplink reference signals across uplink transmissions; receiving, by the base station from the mobile station, second capability information that indicates a capability of the mobile station to support cross-slot channel estimation based on uplink reference signals across uplink transmissions after switching between a first carrier and a second carrier; and transmitting, by the base station to the mobile station, a communication based on channel estimates for uplink transmissions of uplink reference signals on one or more of the first carrier or the second carrier.

Aspect 16: The method of Aspect 15, wherein the capability information indicates that the mobile station is capable of supporting cross-slot channel estimation across uplink transmissions on the first carrier and not the second carrier.

Aspect 17: The method of Aspect 15, wherein the capability information indicates that the mobile station is capable of supporting cross-slot channel estimation across uplink transmissions on the second carrier and not the first carrier.

Aspect 18: The method of Aspect 15, wherein the capability information indicates that the mobile station is capable of supporting cross-slot channel estimation across uplink transmissions on the first carrier and supporting cross-slot channel estimation across uplink transmissions on the second carrier.

Aspect 19: The method of any of Aspects 15-18, wherein the uplink transmissions comprise transmissions of a physical uplink shared channel.

Aspect 20: The method of any of Aspects 15-19, wherein the uplink reference signals comprise demodulation reference signals of a physical uplink shared channel.

Aspect 21: The method of any of Aspects 15-19, wherein the uplink reference signals comprise demodulation reference signals of a physical uplink control channel.

Aspect 22: The method of any of Aspects 15-19, wherein the uplink reference signals comprise sounding reference signals.

Aspect 23: The method of any of Aspects 15-22, wherein the capability information indicates the capability of the mobile station to support cross-slot channel estimation per combination of frequency bands.

Aspect 24: The method of any of Aspects 15-23, wherein supporting cross-slot channel estimation comprises maintaining phase continuity of the uplink reference signals of the uplink transmissions.

Aspect 25: The method of any of Aspects 15-24, wherein the first carrier is a normal uplink (NUL) carrier, and the second carrier is a supplemental uplink (SUL) carrier.

Aspect 26: The method of any of Aspects 15-24, wherein the first carrier and the second carrier are combined for uplink carrier aggregation.

Aspect 27: The method of Aspect 26, wherein the uplink carrier aggregation includes uplink inter-band carrier aggregation.

Aspect 28: The method of Aspect 26, wherein the uplink carrier aggregation includes uplink intra-band carrier aggregation.

Aspect 29: A method of wireless communication performed by a mobile station, comprising: transmitting, by the mobile station, first uplink reference signals on a first carrier in a first time slot; switching, by the mobile station in a second time slot, between the first carrier and a second carrier for uplink transmission; and transmitting, by the mobile station, second uplink reference signals on the first carrier in a third time slot, wherein, based at least in part on the switching, the transmitting is independent of maintaining phase continuity between the first uplink reference signals and the second uplink reference signals.

Aspect 30: The method of Aspect 29, wherein the first uplink reference signals and the second uplink reference signals comprise demodulation reference signals of a physical uplink shared channel.

Aspect 31: The method of aspect 29, wherein the first uplink reference signals and the second uplink reference signals comprise demodulation reference signals of a physical uplink control channel.

Aspect 32: The method of Aspect 29, wherein the first uplink reference signals and the second uplink reference signals comprise sounding reference signals.

Aspect 33: The method of any of aspects 29-32, wherein the first uplink reference signals and the second uplink reference signals are transmitted on the first carrier, and the switching comprises switching from the first carrier to the second carrier.

Aspect 34: The method of Aspect 33, wherein, during the second time slot, an uplink transmission on the first carrier overlaps in time with an uplink transmission on the second carrier.

Aspect 35: The method of any of Aspects 29-34, wherein simultaneous transmission on the first carrier and the second carrier is not supported by the mobile station.

Aspect 36: The method of any of Aspects 29-34, wherein simultaneous transmission on the first carrier and the second carrier is supported by the mobile station.

Aspect 37: The method of any of Aspects 29-36, wherein the first carrier is a normal uplink (NUL) carrier, and the second carrier is a supplemental uplink (SUL) carrier.

Aspect 38: The method of any of Aspects 29-36, wherein the first carrier and the second carrier are combined for uplink carrier aggregation.

Aspect 39: The method of Aspect 38, wherein the uplink carrier aggregation includes uplink inter-band carrier aggregation.

Aspect 40: The method of Aspect 38, wherein the uplink carrier aggregation includes uplink intra-band carrier aggregation.

Aspect 41: An apparatus for wireless communication at a device, comprising a processor; memory coupled with the processor; and instructions stored in the memory and executable by the processor to cause the apparatus to perform the method of one or more of Aspects 1-40.

Aspect 42: A device for wireless communication, comprising a memory and one or more processors coupled to the memory, the memory and the one or more processors configured to perform the method of one or more of Aspects 1-40.

Aspect 43: An apparatus for wireless communication, comprising at least one means for performing the method of one or more of Aspects 1-40.

Aspect 44: A non-transitory computer-readable medium storing code for wireless communication, the code comprising instructions executable by a processor to perform the method of one or more of Aspects 1-40.

Aspect 45: A non-transitory computer-readable medium storing a set of instructions for wireless communication, the set of instructions comprising one or more instructions that, when executed by one or more processors of a device, cause the device to perform the method of one or more of Aspects 1-40.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
   one or more memories; and
   one or more processors configured to, based at least in part on information stored in the one or more memories:
      transmit an indication of the mobile station being capable of supporting cross-slot channel estimation based on uplink reference signals across uplink transmissions;
      generate, based at least in part on transmitting the indication, capability information that indicates a capability of the mobile station to support cross-slot channel estimation, based on the uplink reference signals across the uplink transmissions, after switching between a first carrier and a second carrier; and
      transmit the capability information.

2. The mobile station of claim 1, wherein the capability information indicates that the mobile station is capable of supporting cross-slot channel estimation across uplink transmissions on the first carrier and not the second carrier.

3. The mobile station of claim 1, wherein the capability information indicates that the mobile station is capable of supporting cross-slot channel estimation across uplink transmissions on the second carrier and not the first carrier.

4. The mobile station of claim 1, wherein the capability information indicates that the mobile station is capable of supporting cross-slot channel estimation across uplink transmissions on the first carrier and supporting cross-slot channel estimation across uplink transmissions on the second carrier.

5. The mobile station of claim 1, wherein the uplink transmissions comprise transmissions of a physical uplink shared channel.

6. The mobile station of claim 1, wherein the uplink reference signals comprise demodulation reference signals of a physical uplink shared channel or a physical uplink control channel.

7. The mobile station of claim 1, wherein the uplink reference signals comprise sounding reference signals.

8. The mobile station of claim 1, wherein the capability information indicates the capability of the mobile station to support cross-slot channel estimation per combination of frequency bands.

9. The mobile station of claim 1, wherein the one or more processors, when supporting cross-slot channel estimation, are configured to maintain phase continuity of the uplink reference signals of the uplink transmissions.

10. The mobile station of claim 1, wherein the first carrier is a normal uplink (NUL) carrier, and the second carrier is a supplemental uplink (SUL) carrier, and wherein the one or more processors, to generate the capability information, are configured to generate the capability information further based at least in part on being capable of switching to or from the SUL carrier.

11. The mobile station of claim 1, wherein the first carrier and the second carrier are combined for uplink carrier aggregation.

12. The mobile station of claim 11, wherein the uplink carrier aggregation includes uplink inter-band carrier aggregation.

13. The mobile station of claim 11, wherein the uplink carrier aggregation includes uplink intra-band uplink carrier aggregation.

14. A network node for wireless communication, comprising:
   one or more memories; and
   one or more processors configured to, based at least in part on information stored in the one or more memories:
      receive first capability information that indicates a capability of a mobile station to support cross-slot channel estimation based on uplink reference signals across uplink transmissions;
      receive, based on receiving the first capability information, second capability information that indicates a capability of the mobile station to support cross-slot channel estimation, based on the uplink reference signals across the uplink transmissions, after switching between a first carrier and a second carrier; and
      transmit a communication based on channel estimates for uplink transmissions of uplink reference signals on one or more of the first carrier or the second carrier.

15. The network node of claim 14, wherein the capability information indicates that the mobile station is capable of supporting cross-slot channel estimation across uplink transmissions on the first carrier and not the second carrier.

16. The network node of claim 14, wherein the capability information indicates that the mobile station is capable of supporting cross-slot channel estimation across uplink transmissions on the second carrier and not the first carrier.

17. The network node of claim 14, wherein the capability information indicates that the mobile station is capable of supporting cross-slot channel estimation across uplink transmissions on the first carrier and supporting cross-slot channel estimation across uplink transmissions on the second carrier.

18. The network node of claim 14, wherein the uplink reference signals comprise demodulation reference signals of a physical uplink shared channel.

19. The network node of claim 14, wherein the uplink reference signals comprise demodulation reference signals of a physical uplink control channel.

20. The network node of claim 14, wherein the uplink reference signals comprise sounding reference signals.

21. The network node of claim 14, wherein the capability information indicates the capability of the mobile station to support cross-slot channel estimation per combination of frequency bands.

22. The network node of claim 14, wherein the one or more processors, when supporting cross-slot channel estimation, are configured to maintain phase continuity of the uplink reference signals of the uplink transmissions.

23. A mobile station for wireless communication, comprising:
a memory; and
one or more processors configured to, based at least in part on information stored in the memory:
transmit first uplink reference signals on a first carrier in a first time slot;
switch between the first carrier and a second carrier for uplink transmission in a second time slot; and
transmit second uplink reference signals on the first carrier in a third time slot, wherein, based at least in part on the switching, the transmitting is independent of maintaining phase continuity between the first uplink reference signals and the second uplink reference signals.

24. The mobile station of claim 23, wherein the first uplink reference signals and the second uplink reference signals comprise demodulation reference signals of a physical uplink shared channel.

25. The mobile station of claim 23, wherein the first uplink reference signals and the second uplink reference signals comprise demodulation reference signals of a physical uplink control channel.

26. The mobile station of claim 23, wherein the first uplink reference signals and the second uplink reference signals comprise sounding reference signals.

27. The mobile station of claim 23, wherein the first uplink reference signals and the second uplink reference signals are transmitted on the first carrier, and the switching comprises switching from the first carrier to the second carrier.

28. The mobile station of claim 27, wherein, during the second time slot, an uplink transmission on the first carrier overlaps in time with an uplink transmission on the second carrier.

29. The mobile station of claim 23, wherein simultaneous transmission on the first carrier and the second carrier is not supported by the mobile station.

30. The mobile station of claim 23, wherein simultaneous transmission on the first carrier and the second carrier is supported by the mobile station.

* * * * *